US011888707B2

(12) United States Patent
Ucci et al.

(10) Patent No.: US 11,888,707 B2
(45) Date of Patent: Jan. 30, 2024

(54) METHOD FOR DETECTING ANOMALIES IN COMMUNICATIONS, AND CORRESPONDING DEVICE AND COMPUTER PROGRAM PRODUCT

(71) Applicant: Aizoon S.r.l., Turin (IT)

(72) Inventors: Daniele Ucci, Turin (IT); Filippo Sobrero, Turin (IT); Federica Bisio, Turin (IT)

(73) Assignee: AIZOON S.R.L., Turin (IT)

( * ) Notice: Subject to any disclaimer, the term of this patent is extended or adjusted under 35 U.S.C. 154(b) by 0 days.

(21) Appl. No.: 18/088,279

(22) Filed: Dec. 23, 2022

(65) Prior Publication Data

US 2023/0216746 A1  Jul. 6, 2023

(30) Foreign Application Priority Data

Dec. 31, 2021  (IT) .................. 102021000033203

(51) Int. Cl.
| | |
|---|---|
| *H04L 41/16* | (2022.01) |
| *H04L 43/04* | (2022.01) |
| *G06N 20/10* | (2019.01) |
| *G06F 18/23213* | (2023.01) |
| *G06N 7/01* | (2023.01) |
| *G06F 18/20* | (2023.01) |

(52) U.S. Cl.
CPC .............. *H04L 41/16* (2013.01); *G06F 18/29* (2023.01); *G06N 7/01* (2023.01); *G06N 20/10* (2019.01); *H04L 43/04* (2013.01)

(58) Field of Classification Search
CPC ......... H04L 41/16; H04L 43/04; G06N 20/10; G06N 7/01; G06F 18/29; G06F 18/24155; G05B 23/024
See application file for complete search history.

(56) References Cited

U.S. PATENT DOCUMENTS

| | | | |
|---|---|---|---|
| 11,057,414 B1* | 7/2021 | Giorgio | ............... H04L 63/1416 |
| 2016/0359887 A1 | 12/2016 | Yadav et al. | |
| 2019/0132344 A1* | 5/2019 | Lem | ...................... G06N 20/00 |
| 2020/0366699 A1 | 11/2020 | Sampaio et al. | |
| 2021/0014205 A1 | 1/2021 | Montoya | |
| 2021/0092141 A1 | 3/2021 | Gamble et al. | |
| 2021/0204152 A1* | 7/2021 | Vasudevan | ............ H04W 28/24 |
| 2021/0273960 A1* | 9/2021 | Humphrey | .......... H04L 63/1425 |

(Continued)

OTHER PUBLICATIONS

Aubet Francois-Xavier, "machine Learning-Based Adaptive Anomaly Detection in Smart Spaces", Thesis paper, Retrieved from the Internet on Jan. 7, 2022, <https://www.net.in.tum.de/fileadmin/bibtex/publications/theses/ba-aubet.pdf>, 114 pages, Apr. 2018.

(Continued)

*Primary Examiner* — Muhammad Raza
(74) *Attorney, Agent, or Firm* — Nixon & Vanderhye P.C.

(57) ABSTRACT

Techniques for detecting anomalies in communication networks are provided. Bayesian networks (first and second) are trained for each feature in first and second lists of features. Third and fourth lists of features are generated and then the first and second Bayesian networks are used to classify each value of the third list of features and of the fourth list of features, respectively, as normal or anomalous. In some examples, a Support Vector Machine can be used for the classification.

11 Claims, 6 Drawing Sheets

(56) References Cited

U.S. PATENT DOCUMENTS

| | | | | |
|---|---|---|---|---|
| 2021/0273973 A1* | 9/2021 | Boyer | ............... | H04L 63/1416 |
| 2021/0281583 A1* | 9/2021 | Okunlola | ............... | G06F 40/30 |
| 2021/0360015 A1* | 11/2021 | Mammadli | ......... | H04L 63/1466 |
| 2022/0060491 A1* | 2/2022 | Achleitner | .......... | H04L 63/1425 |
| 2022/0148580 A1* | 5/2022 | Kumar | .................. | G06F 18/29 |
| 2023/0136756 A1* | 5/2023 | Malboubi | ............... | G06N 5/01 |
| | | | | 709/224 |

OTHER PUBLICATIONS

Fernandes et al., "A Comprehensive Survey on Network Anomaly Detection", Telecommunication Systems, vol. 70, No. 3, pp. 447-489, Jul. 2, 2018.

Nguyen et al. "Gee: A Gradient-based Explainable Variational Autoencoder for Network Anomaly Detection", 2019 IEEE Conference On Communications And Network Security (CNS), pp. 91-99, Jun. 10, 2019.

Extended European Search Report for Application No. EP 22208160.6, 15 pages, dated May 10, 2023.

Italian Search Report with English Translation for Application No. 202100033203, 15 pages, dated Aug. 9, 2022.

* cited by examiner

METHOD FOR DETECTING ANOMALIES IN COMMUNICATIONS, AND CORRESPONDING DEVICE AND COMPUTER PROGRAM PRODUCT

This application claims priority to IT Patent Application No. 102021000033203 filed Dec. 31, 2021, the entire contents of which is hereby incorporated by reference.

TECHNICAL FIELD

The embodiments of the present disclosure relate to techniques for analysis of communications implemented, in particular, within one or more computers forming part of a network-security monitoring platform (NSMP), also identified as Security Network Monitoring Platform (SNMP).

BACKGROUND

FIG. 1 shows a typical communication system. In the example considered, the system comprises a router 20 configured for exchanging data between a LAN (Local-Area Network) 10 and a WAN (Wide-Area Network) 30, such as the Internet. For this purpose, the router 20 has an interface responsible for communication with the WAN 30. This interface may inter alia be:
- a DSL (Digital Subscriber Line) modem;
- a mobile communication interface, such as a GSM (Global System for Mobile Communications) transceiver, a CDMA (Code-Division Multiple Access) transceiver, a W-CDMA (Wideband Code-Division Multiple Access) transceiver, a UMTS (Universal Mobile Telecommunications System) transceiver, an HSPA (High-Speed Packet Access) transceiver, and/or an LTE (Long-Term Evolution) transceiver;
- an Ethernet communication interface (copper and/or optical fibre); and/or
- a Wi-Fi communication interface, compatible with one of the versions of the IEEE 802.11 standard.

Typically, the router 20 further comprises one or more communication interfaces for connection to the LAN 10. For instance, in FIG. 1 the LAN 10 is a wired network formed by one or more switches 100, constituted, for example, by Ethernet ports for copper cables (typically RJ45 cables), and/or optical fibres. Consequently, one or more local clients DEV can be connected to the LAN 10 through one or more switches 100. For instance, FIG. 1 illustrates a fixed computer DEV1 and a notebook DEV2, i.e., computers with a wired network interface controller. In general, the LAN 10 may also have inside it wireless devices, capable of communicating with one another and with the WAN 30, for example, via Wi-Fi. In this case, the LAN 10 envisages one or more access points 102, which are connected to one or more switches 100. For instance, represented in FIG. 1 is a local client DEV3, which could be either a notebook or a tablet, i.e., a computer with a wireless network interface controller. Exchange of data between the various devices of the network can be carried out using various protocols. For instance, frequently the exchange of data between two devices is carried out via the IP (Internet Protocol). The various details of the IP and of the various layers of the network protocols are well known to the person skilled in the art. Consequently, the local clients DEV can access at least one of the following:
- a local server SRVL connected to the LAN 10;
- a remote server SRVR connected to the WAN 30; and
- a server SRVDMZ connected to a so-called DMZ (De-Militarized Zone) managed by the router 20.

The person skilled in the art will obviously note that modern computer networks may be much more complex. In fact, the LAN 10 could also be formed by a very large number of local clients DEV, servers SRV and/or SRVDMZ, and further components of the infrastructure of the LAN 10 (for example, switches 100 and/or access points 102, routers 20, etc.). Moreover, the LAN may also comprise a plurality of LAN subnetworks, connected through a VPN (Virtual Private Network). Again, in order to improve network security, one or more of the devices may be configured as firewalls or, in general, execute functions of filtering of the data packets: for example, the switch 100, the access point 102, and the router 20 can implement filtering functions, whereas the server SRVL and/or the server SRVDMZ can function as firewalls.

To improve further network security, modern computer networks frequently rely on antivirus software, installed on the various computers (DEV, SRVL, and/or SRVDMZ). The antiviruses typically monitor the programs that are downloaded and executed by a computer, but also the traffic generated by the corresponding computer, for the following protocols: HTTP (HyperText Transfer Protocol), HTTPS (HyperText Transfer Protocol over Secure Socket Layer/Transport Layer Security), POP (Post-Office Protocol), in particular version 3 (POP3), IMAP (Internet Message Access Protocol), SMTP (Simple Mail Transfer Protocol), SMB (Server Message Block), etc.

Recently, networks have been enriched with network-security monitoring platforms (NSMP), also identified as Security Network Monitoring Platform (SNMP), which collect, treat, and process data flows observed in quasi real time to identify possible computer attacks or anomalous behaviors in the network monitored, such as the LAN 10 and/or the DMZ.

In particular, as shown in FIG. 1, an SNMP comprises at least one computer 400. The computer 400 receives from various data-traffic sensors a copy of the data that are exchanged between different devices. Consequently, by analyzing the data exchange, the computer 400 can detect possible anomalous behaviors. For instance, as shown in FIG. 1, these data-traffic sensors can be implemented with at least one of the following:
- a port of a so-called Switched Port Analyzer (SPAN) type, or one of its variants, such as Remote SPAN (RSPAN), Port-based SPAN (PSPAN), or VLAN-based SPAN (VSPAN), in which a managed switch 100 is configured to send a copy of the traffic exchanged through the switch 100 to the computer 400;
- a router 20 (or a firewall) configured for sending a copy of the traffic exchanged through the router 20 (or the firewall) to the computer 400; or
- a dedicated passive or active TAP (Terminal Access Point) 404 configured for sending a copy of the traffic that passes through the TAP 404 to the computer 400.

Frequently, these data-traffic sensors do not necessarily send a copy of all the traffic, but can send:
- a copy of the traffic that meets given rules, for example with reference to the source and/or destination port of the switch 100, the source and/or IP destination address, the TCP (Transmission Control Protocol) port or UDP (User Datagram Protocol) port, to the higher-level protocol used, such as HTTP, etc.; and/or
- pre-processed data, where the sensor has already extracted some features from the data traffic, the so-called metadata.

Consequently, the computer 400 receives a copy of the traffic containing data and/or metadata that can be analyzed to determine possible anomalous behaviors. For instance, the present applicant markets an SNMP under the name Aramis®.

An SNMP can incorporate various components or software modules that analyze, in parallel, the different characteristics of the data traffic.

Among other things, in the simplest case, a component can check that within the data or metadata of the monitored traffic there are no Indicators of Compromise (IoCs) and/or signatures that may be put down to malevolent activities. For example, these IoCs and/or malevolent signatures may be downloaded from a remote server SRVR connected to the WAN 30, as public or proprietary sources. For instance, in the simplest case, the above IoCs may correspond to given pre-set rules, such as IP addresses and/or URLs (Uniform Resource Locators) of websites that distribute malware. On the other hand, the signatures may be used, in a way similar to a traditional antivirus, for comparing the signature of a file downloaded (for example with the protocol HTTP, POP or IMAP) with a list of signatures of malevolent files. For example, these file signatures may be calculated with a hash function, such as MD5, SHA-1, SHA-2 (for example SHA-256) or SHA-3.

Recently, machine learning has been applied also in the field of cyber security in order to analyze the network traffic and detect automatically any behaviors that deviate from the normal and legitimate behavior of the network, i.e., any behaviors that may be indicators of anomalies and/or malevolent activities. For example, a machine-learning component may use one or more mathematical models with a supervised or non-supervised approach for modelling the normal behavior of each computer DEV and/or server SRVL/SRVDMZ within the LAN 10 and/or the DMZ. Some solutions also enable monitoring of sets of devices, for example all the clients DEV that exchange traffic with the WAN. In general, for supervised approaches, training of the models can be carried out during specific steps, on request, and/or periodically. Hence, once the mathematical model has been trained, this model can be used for classifying the current behavior of the data exchange in the network being monitored. Consequently, whereas the first component is deterministic, the machine-learning component automatically adapts to the behavior of a given network.

Moreover, another component can detect more complex anomalous behaviors by analyzing the traffic through more sophisticated advanced analytics referred to as ACA (Advanced Cybersecurity Analytics). The purpose of these analytics is hence to identify sequences of suspect events that with a certain likelihood can be put down to the phases of an attack. These analytics are typically based on the mathematical modelling of malevolent behaviors through statistical and/or machine-learning approaches.

Use of the above three components makes it possible to alert an operator, i.e., a so-called analyst, in a timely way in the event of an anomaly or attack, for example through the use of display of targeted graphic information and/or by sending notifications to the operator. For example, for this purpose, the computer 400 may be connected to one or more analysis terminals 406. In general, whereas FIG. 1 shows direct connections between the data-traffic sensors 20, 402, 404 and the computer 400, and between the computer 400 and the terminal 406, in practice, this connection can be carried out via the LAN 10 and/or preferably via a dedicated network. Furthermore, as mentioned previously, the platform 400 could also comprise a number of computers that implement different components and/or analyze different traffic.

Consequently, a network-security monitoring platform provides a set of analytics, capable of identifying suspect events that can be put down to an attack. For instance, such a platform is described in the paper by Nguyen Quoc Phong, et al.: "*GEE: A Gradient-based Explainable Variational Autoencoder for Network Anomaly Detection*", 2019 IEEE CONFERENCE ON COMMUNICATIONS AND NETWORK SECURITY (CNS), IEEE, 10 Jun. 2019, pages 91-99, DOI: 10.1109/CNS.2019.8802833. For example, this document describes solutions for detecting whether the communications generated by a given source represent an anomaly. For this purpose, according to the paper, 53 aggregated features are used, which are determined for all the connections of a given IP source within a monitoring window, for example of 3 min. In particular, these features comprise:

mean and standard deviation of flow durations, number of packets, packet rate, and byte rate;
  entropy of protocol type, IP destination addresses, source ports, destination ports, and TCP flags; and
  proportion of ports used for common applications (e.g., WinRPC, Telnet, DNS, SSH, HTTP, FTP, and POP3).

Consequently, the described solution uses aggregated features that are indicative for the overall behavior of all the communications generated by the source in a given monitoring window.

Consequently, by acquiring the values of these features for different sources during a learning step with normal behavior of the network, according to the article a so-called Variational Auto-Encoder (VAE) is trained, which comprises an encoding layer and a decoding layer. In particular, the input nodes and the output nodes of the auto-encoder correspond to the features, and the weights of the auto-encoder are adapted during a training step in such a way that the data supplied at output substantially correspond to the data supplied at input, i.e., the values of the features acquired during the learning step. Consequently, an anomaly in the behavior of a given source may be detected when the estimate supplied by the output layer differs considerably from the values of the features supplied at input to the auto-encoder.

Hence, the solution described in the paper is able to analyze and classify the overall behavior of a given source, but is not able to identify specifically the connections of the source that represent an anomalous behavior.

SUMMARY

Various embodiments of the present disclosure hence regard solutions for detecting anomalies in single communications, generated by one or more devices, of a computer network.

According to one or more embodiments, the above object is achieved through a method having the distinctive elements set forth specifically in the ensuing claims. The embodiments moreover regard a corresponding device, as well as a corresponding computer program product, which can be loaded into the memory of at least one computer and comprises portions of software code for implementing the steps of the method when the product is run on a computer. As used herein, reference to such a computer program product is understood as being equivalent to reference to a computer-readable means containing instructions for controlling a processing system in order to co-ordinate execution of the method. Reference to "at least one computer" is clearly intended to highlight the possibility of the present disclosure being implemented in a distributed/modular way.

The claims form an integral part of the technical teaching of the description provided herein.

As mentioned before, various embodiments of the present disclosure relate to solutions for detecting anomalies in communications exchanged through a communication network between a respective source and a respective destination. For instance, in various embodiments, a computer, for example of an SNMP, obtains metadata for a plurality of communications in a monitoring interval, where the metadata include, for each communication, a source identifier, a destination identifier, and data extracted from an application protocol of the respective communication. Next, the computer processes the data extracted to obtain pre-processed data, which comprise one or more tokens for the respective communication, where each token comprises a string. For instance, in the case of HTTP communications, the one or more tokens may be chosen from among: the HTTP method, the host, the mime type and/or one or more tokens extracted from the user-agent field and/or from the referrer field. In addition or as an alternative, in the case of SMB communications, the one or more tokens may be chosen from among: the relative or absolute path of the file and/or one or more tokens extracted from the path of the file.

In various embodiments, the computer divides the monitoring interval into a training interval and a verification interval. Consequently, the computer can obtain the identifier of a given source and generate a first list of a plurality of features for the connections of the given source in the training interval. For this purpose, the computer selects the connections of the given source in the training interval. Next, the computer determines, for the connections of the given source, the unique destination identifiers and, for each token, the respective unique values, and determines a first set of enumeration rules, enumerating the unique destination identifiers and, for each token, the respective unique values. Consequently, in various embodiments, the computer can associate, by means of the first set of enumeration rules, to each connection of the given source in the training interval, a respective enumerated destination identifier and one or more respective enumerated tokens, where the first list of features comprises, for each connection of the source in the training interval, the respective enumerated destination identifier and the respective one or more enumerated tokens. Optionally, the list of features may also comprise for each connection an enumerated value generated for a TCP or UDP destination port of the respective communication, a numeric value identifying the duration of the connection, and/or a numeric value identifying the amount of data exchanged. In various embodiments, the computer may also discretize one or more of the features, for example by means of a clustering algorithm, preferably a k-means clustering algorithm.

Consequently, unlike what is described in the paper by Nguyen Quoc Phong, the computer generates for each connection a respective set of features, and the enumeration rules are used to transform categorical values into numeric values.

In various embodiments, the computer also obtains the identifier of a set of devices to which the given source belongs and generates a second list of a plurality of features for the connections of the devices that belong to the set of devices in the training interval. For this purpose, the computer can select the connections of the set of devices in the training interval. Next, the computer determines, for the connections of the set of devices, the unique destination identifiers and, for each token, the respective unique values, and determines a second set of enumeration rules, enumerating the unique destination identifiers and, for each token, the respective unique values. Consequently, in various embodiments, the computer can associate, by means of the second set of enumeration rules, to each connection of the set of devices in the training interval, a respective enumerated destination identifier and one or more respective enumerated tokens, where the second list of features comprises, for each connection of the set of devices in the training interval, the respective enumerated destination identifier and the respective one or more enumerated tokens.

For instance, to determine the sets of devices, the computer can generate a respective first list of a plurality of features for the connections of each source in the training interval. Next, the computer can compute, for each feature of the respective first list, a respective mean value, thus generating a list of features that comprises, for each source, the respective mean values of the features of the respective first list, and generate sets of devices by applying a clustering algorithm, preferably a k-means clustering algorithm, to the above list of features.

In various embodiments, the computer then generates a first set of Bayesian networks, training, for each feature of the first list of features, a respective Bayesian network using the data of the other features of the first list of features. In various embodiments, the computer also generates a second set of Bayesian networks, training, for each feature of the second list of features, a respective Bayesian network using the data of the other features of the second list of features.

Consequently, unlike what is described in the paper by Nguyen Quoc Phong, the computer does not use an autoencoder but Bayesian networks. In fact, such networks present the advantage that their training is much faster since the network has to learn only the statistics of the data of the training dataset, which is particularly important when single connections are analyzed in so far as numerous connections must be taken into consideration. In fact, this makes it possible to update periodically the training data individually for each source and for each set of devices. Instead, in the paper by Nguyen Quoc Phong a single training is used on the basis of all the connections of the network. Hence, the solution presented by Nguyen Quoc Phong is not able to learn the individual behavior of a given source and of the respective set of devices.

Consequently, in various embodiments, the computer can generate a third list of a plurality of features for the connections of the given source in the verification interval. For this purpose, the computer selects the connections of the given source in the verification interval, and associates, by means of the first set of enumeration rules, to each connection of the given source, a respective enumerated destination identifier and one or more respective enumerated tokens, where the third list of features comprises, for each connection of the source in the verification interval, the respective enumerated destination identifier and the respective one or more enumerated tokens.

Likewise, the computer can generate a fourth list of a plurality of features for the connections of the given source in the verification interval. For this purpose, the computer selects the connections of the given source in the verification interval, and associates, by means of the second set of enumeration rules, to each connection of the given source, a respective enumerated destination identifier and one or more respective enumerated tokens, where the fourth list of features comprises, for each connection of the source in the verification interval, the respective enumerated destination identifier and the respective one or more enumerated tokens.

Consequently, once the third list of a plurality of features has been obtained, the computer can verify each connection of the given source in the verification interval. For this purpose, the computer determines, on the basis of the values of the features of the third list of features associated to the respective connection, for each feature of the third list of features, the respective most likely value using the first set of Bayesian networks. Consequently, in various embodiments, the computer classifies each value of the features of the third list of features associated to the respective connection, where a value of the features of the third list of features is classified as normal if the value corresponds to the respective most likely value. Instead, in the case where a value of a feature of the third list of features does not correspond to the respective most likely value, the computer can determine, for the value of the feature of the third list of features, the respective likelihood of occurrence using the first set of Bayesian networks, and classify the value of the features of the third list of features as normal if the respective likelihood of occurrence is higher than a first threshold, or as anomalous if the respective likelihood of occurrence is lower than the first threshold.

Likewise, in various embodiments, the computer determines, on the basis of the values of the features of the fourth list of features associated to the respective connection, for each feature of the fourth list of features, the respective most likely value using the second set of Bayesian networks. Consequently, in various embodiments, the computer classifies each value of the features of the fourth list of features associated to the respective connection, where a value of the features of the fourth list of features is classified as normal if the value corresponds to the respective most likely value. Instead, in the case where a value of a feature of the fourth list of features does not correspond to the respective most likely value, the computer can determine, for the value of the feature of the fourth list of features, the respective likelihood of occurrence using the second set of Bayesian networks, and classify the value of the features of the fourth list of features as normal if the respective likelihood of occurrence is higher than a second threshold, and as anomalous if the respective likelihood of occurrence is lower than the second threshold.

Consequently, in various embodiments, the computer can carry out classification of the entire connection. For this purpose, the computer can determine a first number of values of the features of the third list of features that are classified as anomalous and/or determine a second number of values of the features of the fourth list of features that are classified as anomalous, and classify the connection of the given source as anomalous if the first number and/or the second number are/is higher than a third threshold. In addition or as an alternative, the computer can determine a first mean value of the likelihood of occurrence of the values of the features of the third list of features that are classified as anomalous and/or determine a second mean value of the likelihood of occurrence of the values of the features of the fourth list of features that are classified as anomalous, and classify the connection of the given source as anomalous if the first mean value and/or the second mean value are/is lower than a fourth threshold.

Consequently, in the solutions described herein, the computer analyzes the behavior of each connection of a given source, typically a local computer, on the basis of the connections of the same source and of the same set of devices during a training interval. Instead, the solution described in the paper by Nguyen Quoc Phong is only able to detect whether an overall set of connections of a given source, typically a remote computer, is different from the overall normal behavior of the network.

In various embodiments, the computer is configured to verify the classification of the connections classified as anomalous by means of an SVM (Support Vector Machine). For this purpose, the computer trains a first one-class SVM using the first list of features, and/or a second one-class SVM using the second list of features. Consequently, in various embodiments, the computer can classify the values of the features of the third list of features associated to the respective connection as normal or anomalous by means of the first SVM, and/or classify the values of the features of the fourth list of features associated to the respective connection as normal or anomalous by means of the second SVM. Consequently, in this case, the computer can classify the connection as anomalous only if the values of the features of the third list of features and/or the values of the features of the fourth list of features associated to the respective connection are classified as anomalous also through the SVM or SVMs.

BRIEF DESCRIPTION OF THE DRAWINGS

The embodiments of the present disclosure will now be described with reference to the annexed drawings, which are provided purely by way of non-limiting example and in which.

DETAILED DESCRIPTION

In the ensuing description, numerous specific details are provided to enable an in-depth understanding of the embodiments. The embodiments may be implemented without one or more of the specific details, or with other methods, components, materials, etc. In other cases, operations, materials, or structures that are well known are not represented or described in detail so that the aspects of the embodiments will not be obscured.

Reference throughout this description to "an embodiment" or "one embodiment" means that a particular characteristic, distinctive element, or structure described with reference to the embodiment is comprised in at least one embodiment. Hence, the use of the phrases "in an embodiment" or "in one embodiment" in various parts of this description does not necessarily refer to one and the same embodiment. Moreover, the particular characteristics, distinctive elements, or structures may be combined in any way in one or more embodiments.

The references appearing herein are provided only for convenience and do not define the sphere of protection or the scope of the embodiments.

Figure 1:
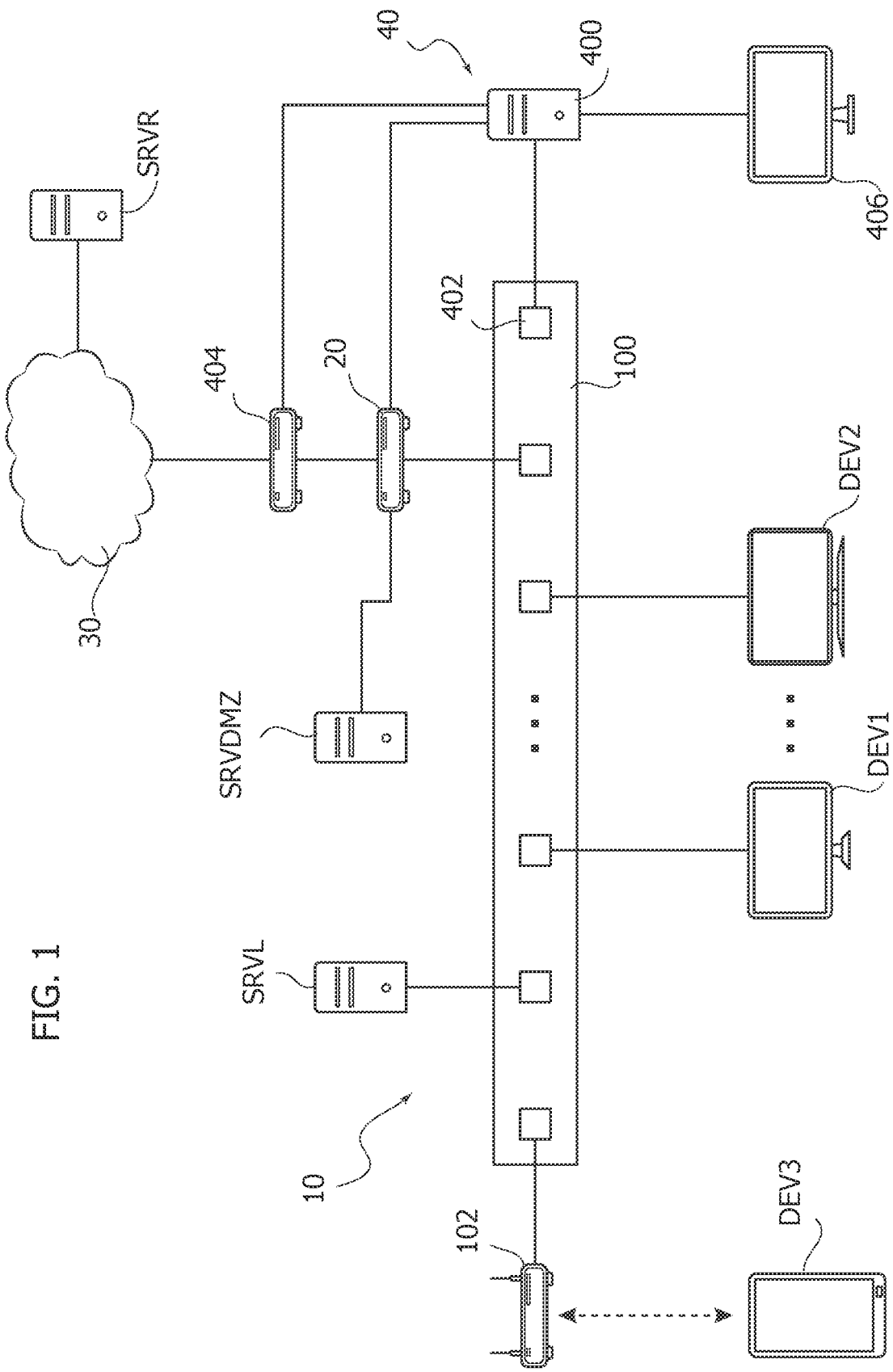
FIG. 1 shows an example of a communication system comprising a network-security monitoring.

In the ensuing FIGS. 2 to 6, the parts, elements, or components that have already been described with reference to FIG. 1 are designated by the same references as those used previously in this figure; the description of these elements that have been described previously will not be repeated hereinafter in order not to overburden the present detailed description.

As mentioned in the previous section, an SNMP makes available to security analysts a set of analytics, capable of identifying sequences of suspect events that in probablistic terms are such as to indicate occurrence of an attack.

In this context, the present description regards a module configured for analyzing the network traffic, preferably also at an application layer. For instance, in various embodiments the module can analyze one or more of the following protocols: HTTP (HyperText Transfer Protocol), POP (Post-Office Protocol), in particular version 3 (POP3), IMAP (Internet Message Access Protocol), SMTP (Simple Mail Transfer Protocol), and SMB (Server Message Block).

In particular, this module analyzes the connections set up by the machines monitored by the SNMP, for example between the clients DEV and a local server SRVL and/or between the clients DEV and the WAN, for detecting inconsistencies with respect to their usual behavior. Consequently, the corresponding function can be implemented within a computer 40a configured to implement an SNMP, for example via software code and/or hardware components. For a general description of such an SNMP reference may be made to the description of FIG. 1.

Figure 2:
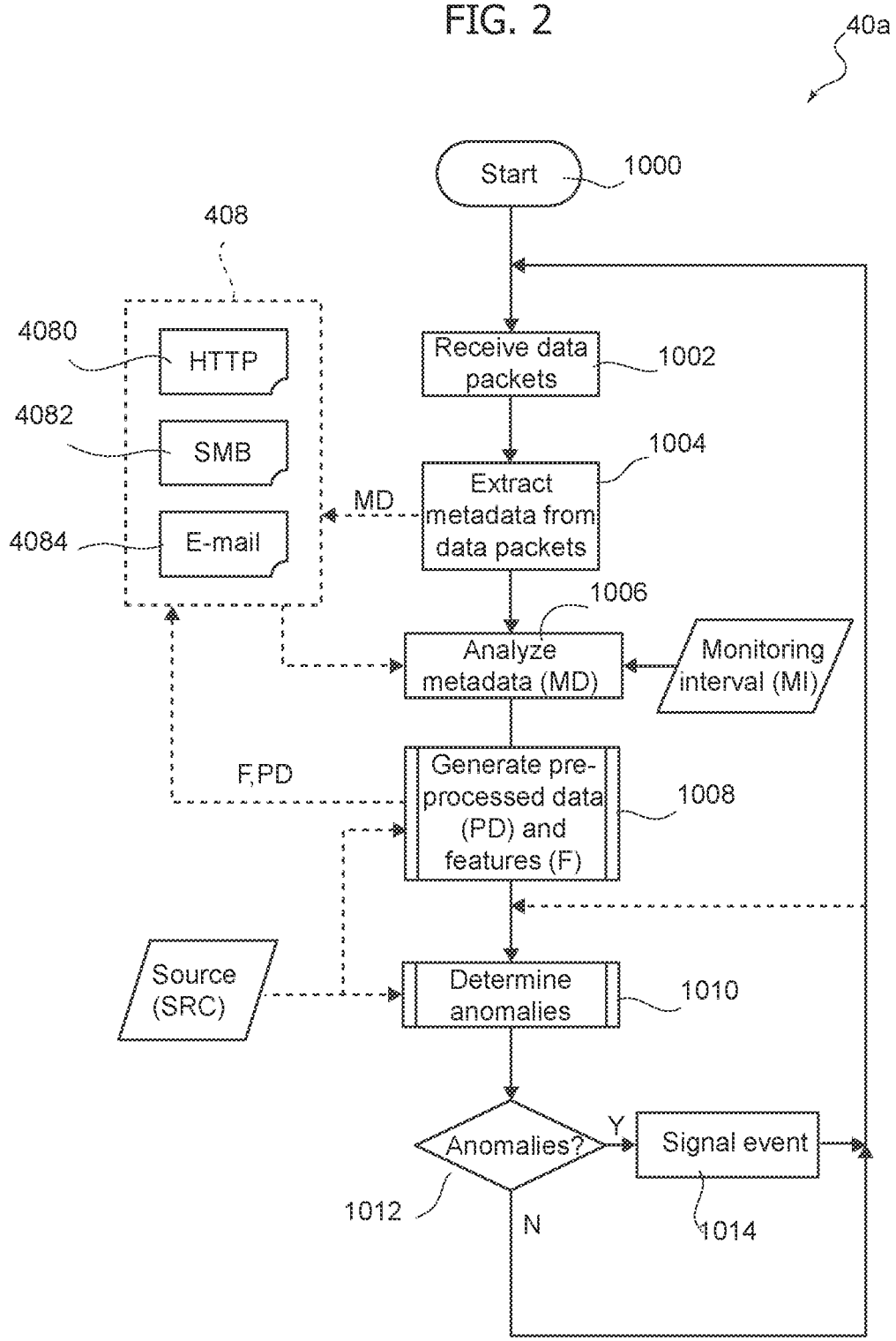
FIG. 2 shows an embodiment of operation of an SNMP, where the platform detects possible anomalies in the communications.

FIG. 2 shows an embodiment of operation of the computer 40a for analyzing communications.

After a starting step 1000, the computer 40a receives (in step 1002) data packets DP from one or more data-traffic sensors. For instance, as explained previously, the above data packets DP can be provided by a SPAN port 402 of a switch 100, a router and/or a firewall 20, a TAP 404, etc. In general, the computer 40a may also be directly integrated in one of the data-traffic sensors, for example within a firewall with sufficient computing capacity.

For instance, with reference to data packets DP in accordance with the IP, each IP packet (IPv4 or IPv6) includes a header comprising an IP source address and an IP destination address. Moreover, each IP packet may include data of a transport protocol, which comprise a payload and possibly further routing information, for example a port for the protocols TCP or UDP. In fact, these transport protocols are used to identify connections between a first device, such as a client DEV, and a second device, such as a server SRV.

Consequently, in step 1004, the computer 40a can process the data packet DP and extract data characterizing the data packet DP. In particular, in various embodiments, the computer 40a can extract from these headers routing information, such as:
- in the case where the data packet DP comprises an IP packet, the IP source address and the IP destination address; and
- in the case where the data packet DP comprises a TCP or UDP packet (possibly included in an IP packet), the respective port.

Moreover, by analyzing unique communications at the transport layer, the computer 40a can also determine the duration of the connection and/or the amount of data exchanged. In general, the amount of data exchanged may correspond to a first datum that indicates the amount of data sent by the first device to the second device, a second datum that indicates the amount of data sent by the second device to the first device, and/or a cumulative value of the first and second data.

In various embodiments, the computer 40a can also determine a so-called hostname and/or domain name associated to the first device and/or to the second device. In addition, by analyzing the communications at the link layer, the computer 40a can determine also the MAC address of the devices of the LAN, for example the MAC addresses of the clients DEV and/or of the local server SRVL.

Consequently, in various embodiments, the computer 40a generates, for the communication exchanged between two devices, for example between a client DEV and a server SRV, respective metadata MD, which may comprise: data that identify the first device (e.g., a client DEV), for instance, the respective IP address and/or MAC address, data that identify the second device (e.g., a server SRV), for instance, the respective IP address and/or the respective domain name, data that identify the UDP or TCP (destination) port of the communication; data that identify the duration of the connection, for example expressed in seconds, and/or data that identify the amount of data exchanged, for example the number of bytes.

In various embodiments, the computer 40a analyzes in step 1004 also the data of the packets DP at the application layer, i.e., the data that are included in the payload of the transport protocols, for example, in the TCP packets. For instance, by analyzing the payload and/or the port number, the computer 40a can detect the type of application protocol and analyze one or more data of the respective protocol. In general, this analysis is well known for non-encrypted (or only partially encrypted) protocols, such as: HTTP (HyperText Transfer Protocol), POP (Post-Office Protocol), in particular version 3 (POP3), IMAP (Internet Message Access Protocol), SMTP (Simple Mail Transfer Protocol), and SMB (Server Message Block).

For instance, with reference to the HTTP, the computer 40a can determine the host name, i.e., the registered domain name of the target or the corresponding IP address, contained in the URI (Uniform Resource Identifier) of the HTTP request. Optionally, the computer 40a can extract also one or more data on the basis of the HTTP request sent, such as the HTTP method used for the request, the user agent, a field normally used to describe the agent generating the request, in such a way as to provide information to improve intercompatibility between systems, and/or the referrer, which contains, in the case of re-addressing of the request, the URI that has caused re-addressing.

Instead, by analyzing the HTTP response, the computer 40a can determine the HTTP status code, i.e., the code that indicates the status of the request, received from the destination.

In various embodiments, the computer 40a can determine also data that identify a type of file, such as a mime type, in particular with reference to the file/payload requested and/or contained in the data of the connection.

Likewise, if the communication regards a resource-sharing protocol, such as SMB, the computer 40a can determine the relative or absolute path of the resource accessed. Moreover, the computer 40a can determine the size of the file exchanged.

The person skilled in the art will appreciate that there exist also encrypted protocols, for example HTTPS (HyperText Transfer Protocol over Secure Socket Layer/Transport Layer Security). In this case, it is practically impossible to analyze the contents of the communication. However, in this case the computer 40*a* can analyze the handshake step of the TLS or SSL protocols. For instance, for this purpose the Italian patent application 102021000015782 may be cited, the contents of which are for this purpose incorporated herein as reference.

In various embodiments, the computer 40*a* is configured for storing the aforesaid metadata MD in a memory or database 408. In general, the metadata MD may be extracted in real time, or the computer 40*a* can store at least in part the data packets DP and process the data packets DP periodically or upon request by an operator. In general, on the basis of the characteristics of the metadata MD, the respective metadata MD can also be stored in different databases or tables of the database itself, or else simply in different log files. For instance, as illustrated schematically in FIG. 2, the computer 40*a* can manage for each application protocol a respective table or a respective log file, such as:

- a table or a log 4080 for the HTTP communications;
- a table or a log 4082 for the SMB communications; and
- optionally one or more tables or log files 4084 for the communications associated to the e-mail protocols, such as POP3, IMAP, and SMTP.

In general, the computer 40*a* could also receive directly the metadata MD from one or more data-traffic sensors, and consequently step 1002 is purely optional.

In various embodiments, the computer 40*a* then analyzes, in step 1006, the metadata MD of the various application protocols (HTTP, SMB, etc.) to extract the metadata MD that regard a given monitoring interval MI. For instance, the monitoring interval MI may be defined by an operator or may be determined automatically. For instance, in various embodiments, step 1006 can be started up once a day, for example in night-time hours, and the computer 40*a* can obtain the metadata MD for a period that corresponds to a given number of days, preferably longer than 15 days, for example a month, starting from the present date.

In various embodiments, the computer 40*a* then processes (in step 1008) the metadata MD of the monitoring interval MI to generate pre-processed data PD and/or to extract a set of features F for each communication. In various embodiments, a portion of these pre-processed data PD and/or of these features F, in particular the data that can be determined by processing individually the metadata MD of a single communication, can also be stored in the memory 408 to prevent these data from having to be calculated each time. Hence, a part of the processing operations of step 1008 may also be implemented in step 1004 to save the pre-processed data PD and/or the features F, associated to a given communication already present in the memory 408.

Consequently, the computer 40*a* can process, in step 1010, the aforesaid features F to determine possible anomalies for a given source device SRC. For instance, the source device SRC may be provided by an operator. As will be described in greater detail hereinafter, to detect possible anomalies, the computer 40*a* is configured to learn, in step 1010, what is the usual network activity of the device within the network being monitored.

Consequently, in step 1012, the computer 40*a* can verify whether any anomalies have been detected. In the case where the computer 40*a* has detected an anomalous behavior (output "Y" from the verification step 1012), the computer 40*a* proceeds to a step 1014, where it signals the event to an operator, for example by sending a notification to the terminal 406 (see FIG. 1). Next, the computer 40*a* returns to step 1002 or 1004 to receive new data packets DP and/or metadata MD, or to step 1010 to analyze the communications of another device SRV. For instance, in this way, the computer 40*a* could repeat automatically steps 1010-1014 for all the devices that have been detected in the network monitored. Instead, in the case where the computer 40*a* has not detected any anomaly (output "N" from the verification step 1012), the computer 40*a* can return directly to step 1002 or step 1004.

Figure 3:
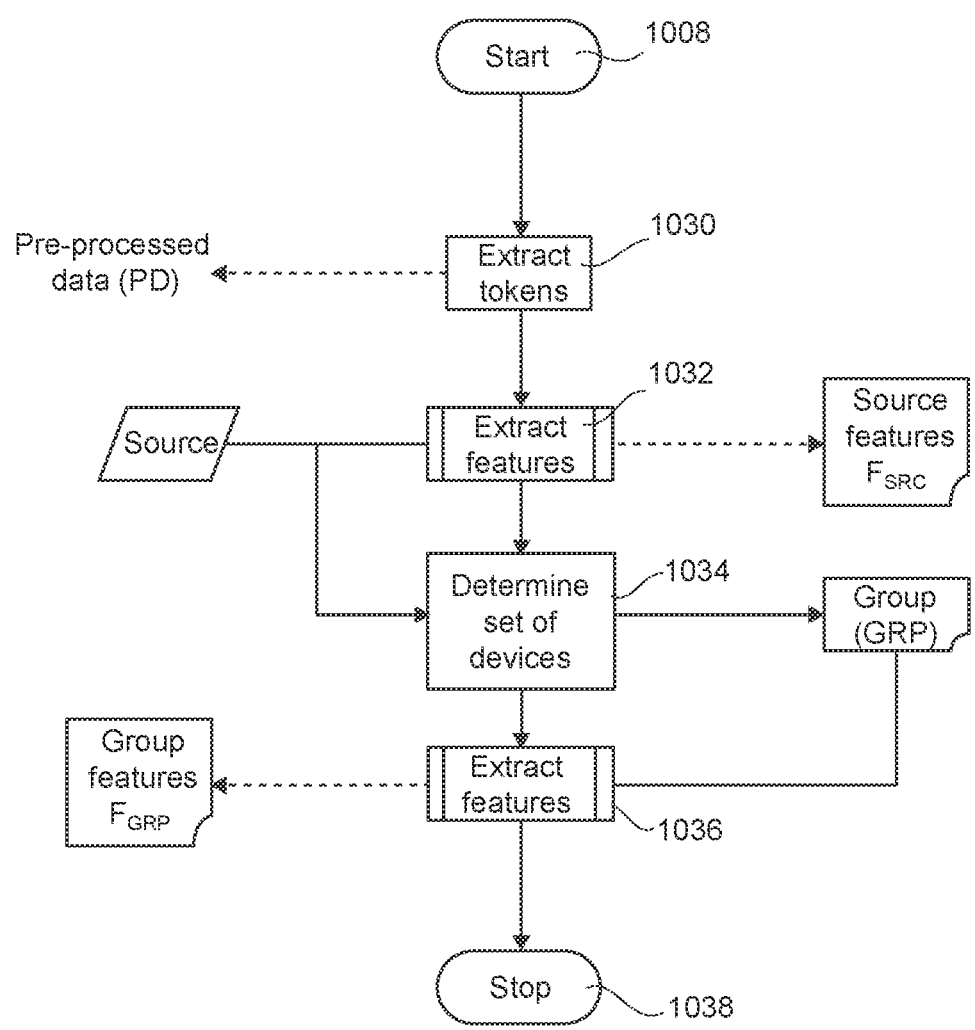
FIG. 3 shows an embodiment of a step of selection of a training and testing dataset that can be used with the platform of FIG. 2.

FIG. 3 shows an embodiment of pre-processing in step 1008.

In particular, as explained previously, by analyzing the data packets DP, the computer 40*a* is able to determine two sets of metadata MD. The first set of basic metadata MD comprises the characteristic data that can be determined on the basis of the IP and of the transport protocol, for example TCP or UDP. For instance, as mentioned previously, for a given source device, said metadata MD may comprise for each communication:

- an identifier of the source machine, for example the IP address and/or MAC address and/or the hostname of the source machine;
- an identifier of the destination machine, for example the IP destination address and/or the hostname of the target machine;
- the TCP or UDP destination port;
- optionally the duration of the connection, for example expressed in seconds; and
- optionally the amount of data exchanged, for example expressed in bytes received at input and sent at output or else evaluated as the sum of the two.

To this first set of basic metadata there may then be added other "specific" metadata that depend upon the application protocol used.

In various embodiments, the computer 40*a* is configured for filtering, in step 1030, one or more of these data to extract important information, the so-called tokens, discarding information of little importance.

For instance, in various embodiments, the computer 40*a* can filter, in step 1030, the user-agent field of the HTTP. For instance, a typical user-agent field may have the following content:

"Mozilla/5.0 (Windows NT 10.0; Win64; x64) AppleWebKit/537.36 (KHTML, like Gecko) Chrome/56.0.2924.87 Safari/537.36"

where the first string "Mozilla/5.0" represents a token that identifies the program used for sending the HTTP request, whereas the following part of the string comprises additional comments. Consequently, the computer 40*a* can filter the user-agent field to extract just the token, i.e., the string up to the first space.

Likewise, the computer 40*a* can process (in step 1030) the URL contained in the referrer field of an HTTP request. For instance, in various embodiments, the computer 40*a* is configured for analyzing the respective string to extract a token chosen from between:

- in the case where the field comprises an IP address, the respective IP address and/or the first token of the path of the URL;
- in the case where the field comprises an FQDN (Fully Qualified Domain Name), the first-level and second-level domain and optionally the first token of the path of the URL.

For instance, in various embodiments, the pre-processing step applied, respectively, to "http://192.168.0.10/aizoon/aizoon.php?action=dashboard.view" and "http://www.aizoon.it/" makes it possible to obtain the token "aizoon" and "aizoon.it".

In various embodiments, the computer 40a can remove possible information on the ports, contained in the URL of the referrer.

Likewise, also with reference to the path of an SMB communication, the computer can extract, in step 1030, one or more tokens from the path of the file. For instance, in various embodiments, the computer 40a could enable specification of a number of subfile levels, and the computer can extract, in step 1030, a first token that comprises only the path up to this number of subfile levels. In addition or as an alternative, the computer can extract, in step 1030, a second token that comprises only the name of the file (without path).

In various embodiments, the pre-processing module 1030 may also manage possible empty fields, for example, assigning a special value "missing". Consequently, the previous tokens can be determined individually for each communication and represent pre-processed data PD.

Consequently, each connection comprises a plurality of parameters, where each parameter corresponds to a respective field of the metadata MD and/or to a respective token of the pre-processed data PD extracted from the metadata MD. In this context, each parameter may comprise a string or a numeric value.

Hence, by analyzing these parameters, the computer 40a can extract (in step 1032) for the source device SRC one or more features from each parameter, thus generating a set of features $F_{SRC}$.

Figure 4:
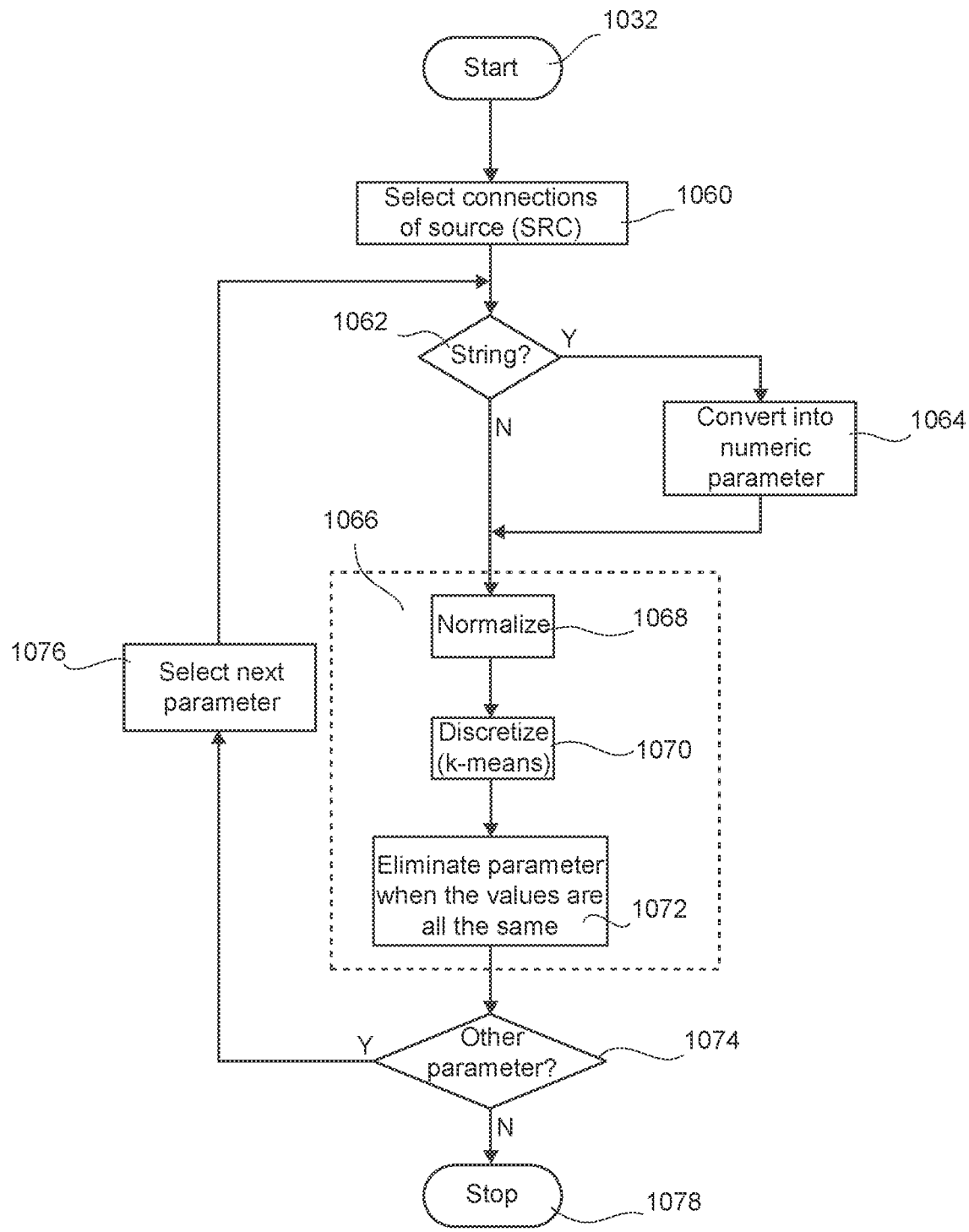
FIG. 4 shows an embodiment of a feature-extraction step that can be used during the selection step of FIG. 3.

FIG. 4 shows a possible embodiment of step 1032.

In particular, in step 1060, the computer 40a filters the connections obtained in step 1006, for selecting only the connections that comprise, as identifier of the source machine, the source device SRC, for example identified via an IP address and/or MAC address, and/or a hostname. Consequently, step 1060 selects only the connections generated by the source device SRC. Moreover, the computer 40a selects a first parameter.

In a verification step 1062, the computer 40a verifies whether the parameter comprises strings or numeric values, i.e., whether the parameter is a numeric parameter $x_N$ or a parameter $x_C$ with non-numeric values. In the case where the parameter comprises strings (output "Y" from the verification step 1062), i.e., a parameter $x_C$, the computer 40a proceeds to a step 1064 to convert the parameter $x_C$ into a respective numeric parameter $x'_N$.

In particular, in various embodiments, to convert the strings into numeric values, the computer 40a considers each unique string of the parameter $x_C$ (i.e., of the respective field of the metadata MD or of a token) as a categorical value and assigns to each unique categorical value (unique string) a respective numeric identifier; i.e., the value of the respective converted numeric parameter $x'_N$ corresponds to enumeration of the categorical value of the respective parameter $x_C$.

For instance, in various embodiments, the computer 40a uses, as identifier of the destination machine, the concatenation of the hostname strings and of the respective IP, for example "www.aizoon.it/192.168.0.10" in such a way as to prevent collisions between machines with the same hostname and/or to take into consideration servers that manage different hostnames through a single IP address. In the embodiment considered, this conversion is hence carried out by enumeration of the distinct categorical values observed in the specific monitoring window. For instance, in this way, also the following data can be converted into numeric parameters $x'_N$:

the IP destination address;

for HTTP communications, the HTTP method, the host, the tokens extracted from the user-agent field and possibly those extracted from the referrer field, and the mime type; and for SMB communications, the relative or absolute path of the file and/or a token extracted from the path.

In general, according to the use of the network, the unique values of a data field/token $x_C$ may even be several. Consequently, in various embodiments, the computer 40a is configured to extract for each field/token $x_C$ only a given number n of most frequent categorical values. For instance, for this purpose, the computer 40a can generate a list of unique values that are detected for the parameter $x_C$, and determine for each unique value a respective value of occurrence. Next, the computer 40a can then determine the value of the respective numeric parameter $x'_N$ by enumerating exclusively the n most frequent categorical values and assign a generic value "others" to all the other (less frequent) values detected. Preferably, the enumeration also follows the occurrence of the unique values; for example, the most frequent value could have the enumeration "1", the least frequent value, once again considered individually, could have the enumeration "n", and the generic value "others" could correspond to the enumeration "n+1". In various embodiments, the value n may be programmable, possibly also individually for each field/token $x_C$. Alternatively, the computer can also determine automatically the value n, for example by incrementing the value n until the likelihood of occurrence of the unique values enumerated individually exceeds a given threshold, for example 80%. This operation hence also enables reduction of the size of the categorical parameters and consequently the computational costs of the subsequent analysis, which, in the case of excessively great dimensionality, could become complex and slow.

Consequently, after conversion of a categorical parameter $x_C$ into a respective numeric parameter $x'_N$, the computer 40a can proceed to a step 1066, where the computer 40a can process the values of the numeric parameter $x'_N$ and/or extract one or more features from the values of the numeric parameter $x'_N$. Likewise, also in the case where the parameter is already a numeric parameter $x_N$ (output "N" from the verification step 1062), the computer 40a can proceed to step 1066. For instance, as mentioned previously, the purely numeric parameters $x_N$ may be the duration of the connection, the volume of data exchanged during the connection, and/or the dimension of a file exchanged through an SMB communication. In general, the computer 40a can manage the HTTP status code and the TCP/UDP destination port as numeric parameter $x_N$ or preferably as categorical parameter $x_C$, with the corresponding operation of enumeration of the unique values (step 1064).

Consequently, step 1066 receives for a given numeric parameter $x_N$ or enumerated parameter $x'_N$, generically denoted hereinafter as parameter x, a respective sequence of values $x_1$, $x_2$, $x_3$, etc., where each value of the parameter x is associated to a respective communication.

In various embodiments, the computer 40a is configured for processing, in a step 1068, said sequence of values through a statistical analysis to determine data characterizing the distribution of the values, for example the respective mean value x and optionally the standard deviation $\sigma(x)$. In general, in the case of an enumerated parameter $x'_N$, the mean value $\bar{x}$ and the standard deviation $\sigma(x)$ can be calculated using the number of occurrences of each enumerated value.

In various embodiments, these statistical data of a numeric parameter x may also be used for normalizing the values of the parameter x. For instance, in various embodiments, the computer 40*a* is configured for computing a normalized parameter x' by centering the values of the respective numeric parameter x around their mean $\bar{x}$, subtracting from them the value of the mean $\bar{x}$ itself, and then dividing the result by their standard deviation σ(x) in order to render more evident the information regarding the variation of the feature with respect to its absolute value; namely, $$x' = \frac{x - \bar{x}}{\sigma(x)}$$

In general, as will be described in greater detail hereinafter, this normalization is purely optional and is preferably applied only for the parameters $x_N$ that were already originally numeric.

In various embodiments, the computer 40*a* can discretize, in a step 1070, the values of a numeric parameter $x_N$, of an enumerated parameter $x'_N$, and/or of a normalized parameter x', also in this case generically denoted as parameter x.

For instance, in the simplest case, the computer 40*a* can determine for the parameter x a range of values between a minimum value $x_{min}$ and a maximum value $x_{max}$. Next, the computer 40*a* can divide the range of values into a number M of sub-intervals, for example of the same size, where associated to each sub-interval is a respective index. For instance, the number M or size of the sub-intervals may be programmable. Hence, the computer can generate a respective discretized parameter $x_D$ by determining, for each value of the parameter x, the respective sub-interval and use as value for the discretized parameter $x_D$ the index of the respective sub-interval.

Instead, in other embodiments, the computer 40*a* is configured to generate, in step 1070, the values of the discretized parameter $x_D$ by means of a clustering algorithm, such as a Lloyd clustering algorithm, for example the k-means clustering algorithm. For instance, in various embodiments, the computer 40*a* is configured for estimating the number K of clusters with the Calinski (Calinski-Harabasz) criterion, a method that typically yields with high likelihood a value of K equal or close to the optimal number of clusters. For instance, for this purpose, also the Wikipedia webpage "Determining the number of clusters in a dataset" may be cited. In general, the aforesaid clustering algorithms are per se well known, and among these there may be cited also the paper by Volkovich, Zeev & Toledano-Kitai, D. & Weber, Gerhard-Wilhelm "*Self-learning K-means clustering: A global optimization approach*", 2013, Journal of Global Optimization 56, DOI: 10.1007/s10898-012-9854-y.

In various embodiments, the computer 40*a* can also determine, in a step 1072, whether the values of a (numeric, enumerated, normalized, or discretized) parameter are all the same and eliminate the respective parameter x in so far as it does not provide any kind of information. For instance, in the case where the computer 40*a* has determined, in step 1068, the standard deviation σ(x), it can determine, in step 1072, whether the standard deviation σ(x), or likewise the variance, is zero. For instance, in this way, there may be eliminated features that make reference to the second set of "specific" metadata, which in turn refer to application protocols that are never used by the device being monitored.

Consequently, in a step 1074, the computer 40*a* can verify whether there are other parameters to be processed. In particular, in the case where there are other parameters to be processed (output "Y" from the verification step 1074), the computer 40*a* can proceed, in a step 1076, to selecting another parameter, and the procedure returns to step 1062 to process the new parameter selected. Instead, in the case where there are no other parameters to be processed (output "N" from the verification step 1074), the pre-processing step 1032 terminates, at an end step 1078.

Consequently, as also illustrated in FIG. 3, the pre-processing procedure 1032 makes it possible to obtain, for the connections of a given source device SRC, respective numeric parameters $x_N$ and enumerated parameters $x'_N$, possibly normalized into parameters $x'_N$ and/or discretized into parameters $x_D$, which represent a set $F_{SRC}$ of features that can be used for analyzing the connections of the device SRC.

In various embodiments, the computer 40*a* can also determine, in a step 1036, a second set $F_{GRP}$ of features for the connections of a set/group of devices to which the device SRC belongs.

For instance, for this purpose, the computer 40*a* can determine, in a step 1034, a set of devices GRP for the device SRC. In general, the set GRP may comprise all the devices of the network, in particular the client devices DEV, or just a subset of the devices of the network. For instance, an operator could specify manually the devices that belong to one and the same set GRP, for example assigning all the computers of a given department to a respective set GRP.

Instead, in various embodiments, the computer may also automatically determine the devices that belong to given sets GRP. For instance, for this purpose, the computer 40*a* may once again use a k-means clustering algorithm. The number of clusters K may be programmable. For instance, the number K may be chosen from 5 and 20 classes of devices, preferably between 5 and 10.

In various embodiments, to speed up processing, instead of analyzing all the communications of all the devices, the computer 40*a* is configured to generate for each device a subset of features, extracting from one or more features the corresponding statistical data that identify the distribution of the respective features, for example the mean value and/or the variance.

For instance, in various embodiments, the computer 40*a* is configured to determine the mean value x for at least each of the following parameters:

- an enumerated parameter $x'_N$ determined for the data that identify the destination device;
- an enumerated parameter $x'_N$ determined for the UDP or TCP destination ports;
- one or more enumerated parameters $x'_N$ determined for the respective tokens extracted from the metadata MD at the application-protocol layer; and
- optionally a numeric parameter $x_N$ that corresponds to the duration of the connection, and/or one or more numeric parameters $x_N$ that identify the number of bytes exchanged.

In various embodiments, to determine these data for all the devices SRC that are monitored by the computer 40*a*, for example for all the devices DEV, step 1032 may hence be repeated for each device SRC. Consequently, in various embodiments, the clustering algorithm receives, in step 1034, for each source device SRC of the network monitored, data that identify the source device, for example the respective IP address and/or MAC address, and the respective sets of mean values x calculated for the features determined for the connections of the source device. On the basis of these data, the clustering algorithm then divides the devices monitored into different clusters, which hence correspond to respective sets GRP.

Consequently, the computer 40a can determine, in step 1036, the connections of all the devices of the set GRP to which the device SRC selected belongs, and then determine the second set $F_{GRP}$ of features for these connections. For instance, for this purpose, the computer can follow, in step 1036, the same steps described with reference to step 1032 (see FIG. 4), to obtain, in step 1060, only the connections of the devices that belong to the set GRP. Finally, step 1008 terminates at an end step 1038.

Consequently, in various embodiments, the computer 40a is configured to obtain, for a given device SRC and a given monitoring interval MI: a first set of features $F_{SRC}$ for the connections of the device SRC and, optionally, a second set of features $F_{GRP}$ for the connections of the devices that belong to the set GRP of the device SRC. In general, in the case where the computer 40a is configured for analyzing all the devices, the computer 40a can hence determine a first set of features $F_{SRC}$ for the connections of each device SRC, and optionally a second set of features $F_{GRP}$ for the connections of each set of devices GRP. In this context, the features $F_{GRP}$ may hence also be determined only once for all the devices of one and the same set GRP.

In various embodiments, the computer 40a can then process, in step 1010, the features $F_{SRC}$ of the device SRV and optionally the features $F_{GRP}$ of the respective set of devices GRP in order to detect anomalies in the connections of the device SRC.

Figure 5:
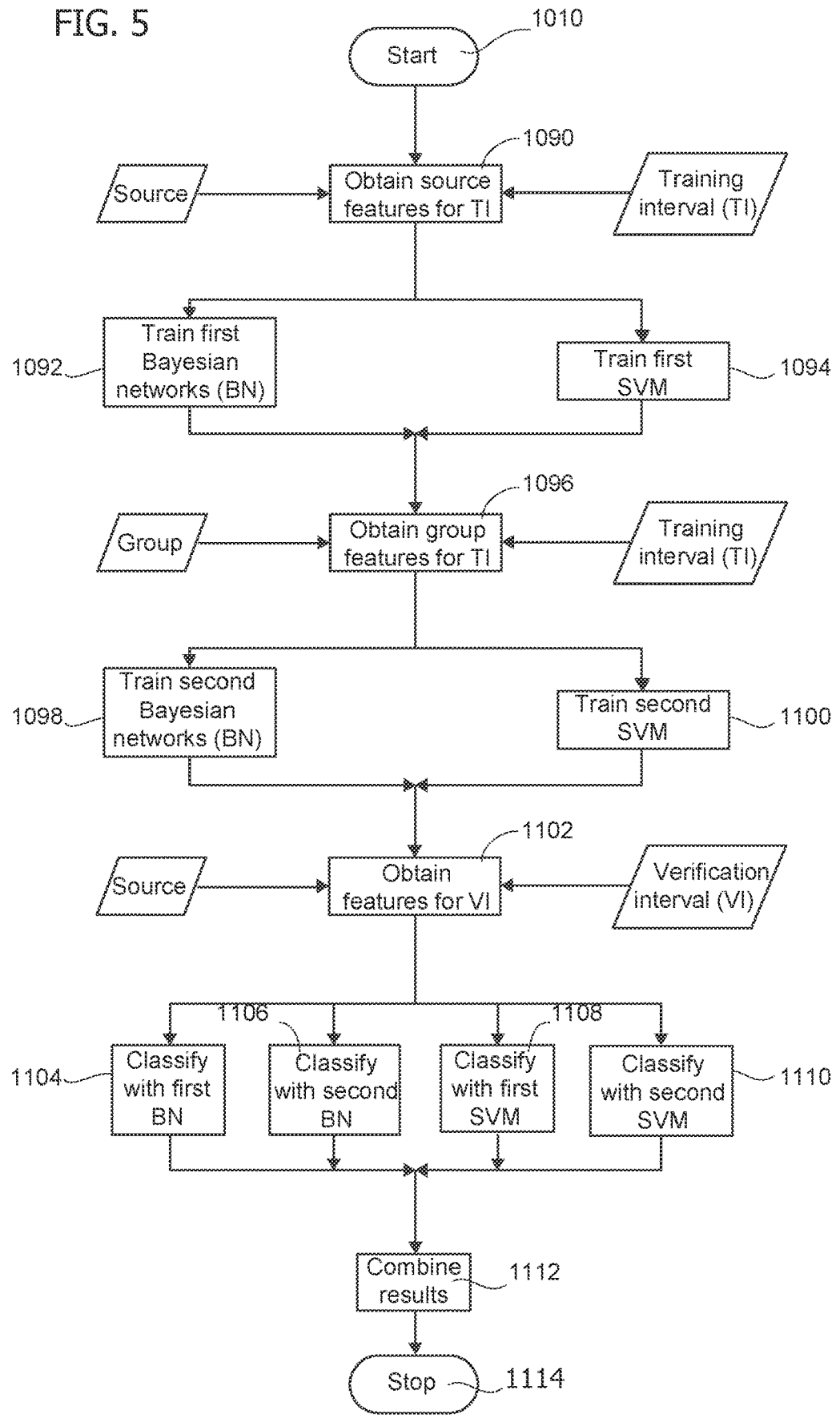
FIG. 5 shows an embodiment of a learning and testing step that can be used with the platform of FIG. 2.

FIG. 5 shows a possible embodiment of the learning and classification step 1010.

In the embodiment considered, the computer 40a is configured to divide the list of the features into a first set associated to the connections in a first time interval, referred to hereinafter as training interval TI, and a second set associated to the connections in a second interval, referred to hereinafter as verification interval VI. In particular, in this case, the monitoring interval MI comprises both of the intervals TI and VI. For instance, in various embodiments, the verification interval VI may correspond to the last day (or likewise to the last week) comprised in the monitoring interval MI, and the training interval TI may correspond to the remaining days of the monitoring interval MI. In general, the duration of the verification interval VI may be constant or variable. For instance, in the case where step 1000 is started up more or less periodically, the verification interval VI may comprise the data from the last startup of the procedure. Consequently, the verification interval VI may even be shorter and correspond approximately to one hour.

Consequently, once step 1010 has been started up, the computer 40a can obtain, in a step 1090, the list of features $F_{SRC}$ of the device SRC for the training interval TI, and use these data, referred to hereinafter as list of features of the training dataset $F_{SRC,TI}$, for training one or more classifiers and/or estimators. In general, as described previously, the set of features $F_{SRC}$ may comprise a plurality of the parameters described previously, in particular, for each field or token considered, the respective numeric parameter $x_N$ or enumerated parameter $x'_N$, possibly normalized $(x'_N)$ and/or discretized $(x_D)$. In particular, in the case of enumerated features, the computer can generate the list of features $F_{SRC,TI}$ only for the connections of the device SRC in the training interval TI. For this purpose, the computer hence selects the connections of the device SRC in the training interval. Next, as described previously, the computer determines, for the aforesaid connections of the device SRC, at least the unique destination identifiers and, for each token, the respective unique values and determines a first set of enumeration rules, enumerating the unique destination identifiers and, for each token, the respective unique values. Consequently, in various embodiments, the computer can associate, by means of the first set of enumeration rules, to each connection of the device SRC in the training interval, a respective enumerated destination identifier and one or more respective enumerated tokens; i.e., the list of features $F_{SRC,TI}$ comprises, for each connection of the device SRC in the training interval, the respective enumerated destination identifier and the respective one or more enumerated tokens.

For instance, in various embodiments, the computer 40a is configured for training, in a step 1092, a Bayesian engine and/or, in a step 1094, an SVM (Support Vector Machine). Classifiers based upon a Bayesian network are per se well known and may be implemented, for example, with R program libraries for statistical data processing. For instance, for this purpose, there may be cited the paper by Mihaljevic, Bojan et al., "*bnclassify: Learning Bayesian Network Classifiers*", January 2019, The R Journal, 10:455, DOI 10.32614/RJ-2018-073. For instance, in various embodiments, the Bayesian engine constructs, in step 1092, NBN (Naïve Bayesian Network) and/or TAN (Tree-Augmented Naïve Bayes) models. For instance, for this purpose, there may be cited the paper by C K Chowet et al., "*Approximating discrete probability distributions with dependence trees*", IEEE Transactions on Information Theory, 14(3):462-467, 1968.

For instance, in various embodiments, assuming that the set of features $F_{SRC}$ comprises m features f, the computer 40a can train a Bayesian network for each feature f by calculating the posterior probability $P(f_i|f)$ between the features $f_i$ of the system and f, with $i=\{1, \ldots, m\}$, $f_i \neq f$.

For instance, in various embodiments, the Bayesian network uses features that have discrete values; namely, the features f and $f_i$ used by the Bayesian engine 1092 are chosen exclusively from among the enumerated parameters $x'_N$ and the discretized parameters $x_D$. For instance, in this case, the posterior probability $P(f_i|f)$ for a given value of the feature f can be calculated by determining the occurrence of each possible value of the feature $f_i$. Consequently, in this way, the distribution of the posterior probability $P(f_i|f)$ can likewise be determined for each possible value of the feature f. For instance, in various embodiments, the computer 40a is configured to use the following set of features $F_{SRC}$:

the enumerated parameter $x'_N$ determined for the data that identify the destination device;

the enumerated parameter $x'_N$ determined for the UDP or TCP destination ports;

one or more enumerated parameters $x'_N$ determined for the respective tokens extracted from the metadata MD at the application-protocol layer; and optionally a discretized parameter $x_D$ determined for the duration of the connection, and/or one or more discretized parameters $x_D$ determined for the number of bytes exchanged.

In the testing step, it is hence possible to estimate the prior probability $P(f|f_i)$ of a given value of the feature f on the basis of a set of features observed $f_i$ using the Bayes theorem:

$$P(f \mid f_i) = h \cdot P(f) \cdot \prod_i^n P(f_i \mid f), f_i \neq f$$

where h is a normalization constant. For instance, for this purpose, there may be cited the paper Langley et al., "*An Analysis of Bayesian Classifiers*", June 1998. For instance, by repeating the calculation of the prior probability $P(f| f_i)$ for all the values of the feature f, the computer 40a can determine the most likely value $\hat{f}$ of the feature f for a given combination of features observed $f_i$.

To do this, it is possible to use either an NBN (Naïve Bayesian Network) or else the TAN (Tree-Augmented Naïve Bayes) algorithm. An NBN can be represented via an AG (Acyclic Graph), where corresponding to each node is a feature $f_i$ and corresponding to each arc is a conditional probability between two features. In addition, in the NBN there is assumed a strong independence between all the features $f_i$, and for this reason the AG is a star graph with a feature f (referred to as "root node") at the center and arcs $e_i = P(f_i|f)$. Unlike NBNs, in TANs the hypothesis of strong independence between the attributes is abandoned, and there is envisaged introduction of an additional arc for each node (with exclusion of the root node) that will connect it to the feature that affects it most.

As shown in FIG. 5, in various embodiments, the computer 40a can obtain, in a step 1096, the list of features $F_{GRP}$ of the set GRP of the device SRC for the training interval TI, and use these data, referred to hereinafter as features $F_{GRP,TI}$, for training, in a step 1098, a second set of k Bayesian networks, for example NBNs or preferably TANs.

Also in this case, in the case of enumerated features, the computer can then generate the list of features $F_{GRP,TI}$ only for the connections of the set of devices GRP in the training interval TI. For this purpose, the computer hence selects the connections of the set of devices GRP in the training interval. Next, as described previously, the computer determines, for the aforesaid connections of the set of devices GRP, at least the unique destination identifiers and, for each token, the respective unique values, and determines a second set of enumeration rules, enumerating the unique destination identifiers and, for each token, the respective unique values. Consequently, in various embodiments, the computer can associate, by means of the second set of enumeration rules, to each connection of the set of devices GRP in the training interval, a respective enumerated destination identifier and one or more respective enumerated tokens; namely, the list of features $F_{GRP,TI}$ comprises, for each connection of the set of devices GRP in the training interval, the respective enumerated destination identifier and the respective one or more enumerated tokens.

Consequently, in various embodiments, step 1092 is used for training m Bayesian networks using the data of the individual device SRC, and step 1098 is used for training k Bayesian networks using the data of the set of devices GRP. In this way, there may hence be generated similar sets of Bayesian networks also for the other monitored devices SRC and possibly for the other sets of devices GRP.

As mentioned previously, in various embodiments, the computer 40a can also train an SVM in step 1094. In particular, in various embodiments, the SVM is a one-class classifier. In this case, the computer 40a uses, in step 1094, a training algorithm that seeks a hypersphere that best circumscribes all the instances of the training dataset, i.e., the list of the data $F_{SRC,TI}$. In fact, through the appropriate adjustment of its hyperparameters, it is possible to exclude the trivial solutions, for example, the one represented by the hypersphere of infinite radius. Consequently, in step 1094, the computer 40a trains an SVM to classify the data $F_{SRC,TI}$ as a normal behavior, which makes it possible to verify whether a given set of features $F_{SRC}$ represents a normal behavior (it lies inside the hypersphere) or an anomalous behavior (it lies outside the hypersphere).

Likewise, in various embodiments, the computer 40a can train, in a step 1100, an SVM using as training dataset the list of the data $F_{GRP,TI}$, i.e., the data of the respective set GRP. In this way, similar SVMs can then be trained for the other monitored devices SRC and possibly for the other sets of devices GRP. As mentioned previously, in various embodiments, the Bayesian networks use discretized parameters. Instead, the SVM 1094 and optionally the SVM 1100 can use the numeric parameters $x_N$ and/or the respective normalized values $x'_N$.

Consequently, the computer 40a can obtain, in step a 1102, the list of features $F_{SRC}$ of the device SRC for the verification/testing interval VI and use these data, referred to hereinafter as list of features or testing dataset $F_{SRC,VI}$ to verify whether each set of features $F_{SRC}$ of the dataset $F_{SRC,VI}$ represents a normal behavior or an anomalous behavior.

In particular, in the case of enumerated features, to generate the list of features $F_{SRC,VI}$ for the connections of the device SRC in the verification interval, the computer can select the connections of the device SRC in the verification interval and associate, by means of the first set of enumeration rules described previously, to each connection of the device SRC a respective enumerated destination identifier and one or more respective enumerated tokens, where the list of features $F_{SRC,VI}$ comprises, for each connection of the device SRC in the verification interval, the respective enumerated destination identifier and the respective one or more enumerated tokens.

Consequently, in various embodiments, the computer 40a can use a given set of features $F_{SRC}$ of the testing dataset $F_{SRC,VI}$ to determine, in step 1104, through the Bayesian networks trained in step 1092, whether the respective combination of values indicates a normal behavior or a suspect/anomalous behavior. For instance, in various embodiments, the computer 40a estimates for this purpose the value of a feature f under observation using as prediction method the so-called likelihood weighting. In this case, the computer 40a can estimate, for each possible value of a feature f, the respective probability $P(f| f_i)$ using the other features $f_i$ of the set of features $F_{SRC}$. Next, the computer can hence select the most likely value $\hat{f}$ and compare the most likely value estimated $\hat{f}$ with the value of the respective feature f of the given set of features $F_{SRC}$. In the case where the values correspond, the value of the feature f is considered normal. Instead, if the effective value is different from the most likely value f, the computer 40a compares the probability of the real event occurring $P(f| f_i)$ with a (preferably configurable) threshold. In various embodiments, the computer 40a can compute the threshold also as a function of the probability of the most likely value estimated $\hat{f}$.

Consequently, in the case where the value of the feature f is different from the most likely value $\hat{f}$ and the probability of the current value of the prediction is below the threshold, the computer 40a can classify the value of the feature f as suspect/anomalous. Hence, the NBN or TAN models yield a measurement of coherence for each of the values of the features f observed with respect to the usual activity of the machine SRC analyzed. In fact, the lower the confidence calculated by a TAN model for a specific observed value of the feature f, the higher the inconsistency of the observed value in the network traffic.

In this context, the training step takes into consideration a given set of features $F_{SRC}$, which typically comprises enumerated values, whilst the features with zero variance can be eliminated (step 1072). Consequently, only the testing features that are present also during training may be considered. To solve this problem, each new value of a categorical variable never seen during training can be set at the value "others". In this case, irrespective of the corresponding likelihood, the computer 40a can consider the value "others" always as being anomalous.

The inventors have noted that there are likely to be incoherences in individual features also with a normal data traffic. Consequently, in various embodiments, the computer classifies a given connection, as identified through the respective set of features $F_{SRC}$, as suspect only if the number of features identified as suspect exceeds a given threshold, which for example may correspond to m/2; i.e., a connection is judged suspect if and only if there are encountered incoherences for the majority of the features.

In addition or as an alternative, the computer 40a can compute a mean value for a given connection as a function of the incoherences of all the features and/or of only the features that are different from the respective most likely value. Consequently, in this case, the computer 40a can compare this mean value with a threshold that makes it possible to set a percentage of incoherence below which the entire datum is considered coherent (this can be done to eliminate possible data with low incoherence that could be false positives).

Consequently, the computer 40a determines in step 1104—by means of the Bayesian networks trained in step 1092 for the training dataset $F_{SRC,TI}$—the connections of the testing dataset $F_{SRC,VI}$ that are suspect. In various embodiments, the computer 40a can then also determine in a step 1106—by means of the Bayesian networks trained in step 1098 for the training dataset $F_{GRP,TI}$—the connections of the testing dataset $F_{SRC,VI}$ that are suspect.

In particular, in the case of enumerated features, the computer can generate for this purpose a list of features $F_{GRP,VI}$ for the connections of the device SRC in the verification interval. To generate this list of features $F_{GRP,VI}$, the computer can select the connections of the device SRC in the verification interval and associate this time, by means of the second set of enumeration rules described previously, to each connection of the device SRC, a respective enumerated destination identifier and one or more respective enumerated tokens, where the list of features $F_{SRC,VI}$ comprises, for each connection of the device SRC in the verification interval, the respective enumerated destination identifier and the respective one or more enumerated tokens. Consequently, whereas step 1104 verifies the list of features $F_{SRC,VI}$ that comprises enumerated features with the enumeration rules determined for the individual device SRC, step 1106 verifies the list of features $F_{GRP,VI}$ that comprises enumerated features with the enumeration rules determined for the set of devices GRP.

In various embodiments, the computer 40a can then also determine in a step 1108—by means of the SVM trained in step 1094 for the training dataset $F_{SRC,TI}$—the connections of the testing dataset $F_{GRP,VI}$ that are suspect, i.e., classified as anomalous. In various embodiments, the computer 40a can also determine in a step 1110—by means of the SVM trained in step 1100 for the training dataset $F_{GRP,TI}$—the connections of the testing dataset $F_{GRP,VI}$ that are suspect. In general, the computer can classify all the connections by means of the SVM 1094 and/or the SVM 1100. As an alternative, the computer 40a can classify, in step 1108, only the connections that have been identified as suspect in step 1104, and likewise the computer 40a can classify, in step 1110, only the connections that have been identified as suspect in step 1106.

Consequently, in a step 1112, the computer can combine the results supplied by the various estimators, and the procedure terminates at an end step 1114. For instance, in the simplest case, the computer 40a can classify a connection as suspect if:

the first Bayesian engine indicates, in step 1104, that the respective connection is suspect, and (when used) also the first SVM indicates, in step 1108, that the same connection is suspect; or optionally, the second Bayesian engine indicates, in step 1106, that the respective connection is suspect, and (when used) also the second SVM indicates, in step 1108, that the same connection is suspect.

In what follows, some additional embodiments will now be described. As explained previously, in various embodiments, the computer acquires the data of a given machine SRC and possibly for a respective set GRP for a monitoring interval MI in which the connection data are divided into a training dataset TI and a testing dataset VI.

However, the data to be processed may amount to a very large number. For instance, as explained previously, to limit the number of possible values of numeric parameters $x_N$ or of enumerated parameters $x'_N$, the number of possible values of each feature can be reduced by applying, in step 1070, a clustering algorithm, such as a k-means clustering algorithm. This hence enables reduction of the computational costs of the Bayesian networks 1092 and 1098.

However, frequently a large number of connections must be processed. In order to limit the amount of data gathered and balance them as much as possible for each machine, the learning and classification module 1010 can execute a sampling operation.

Figure 6:
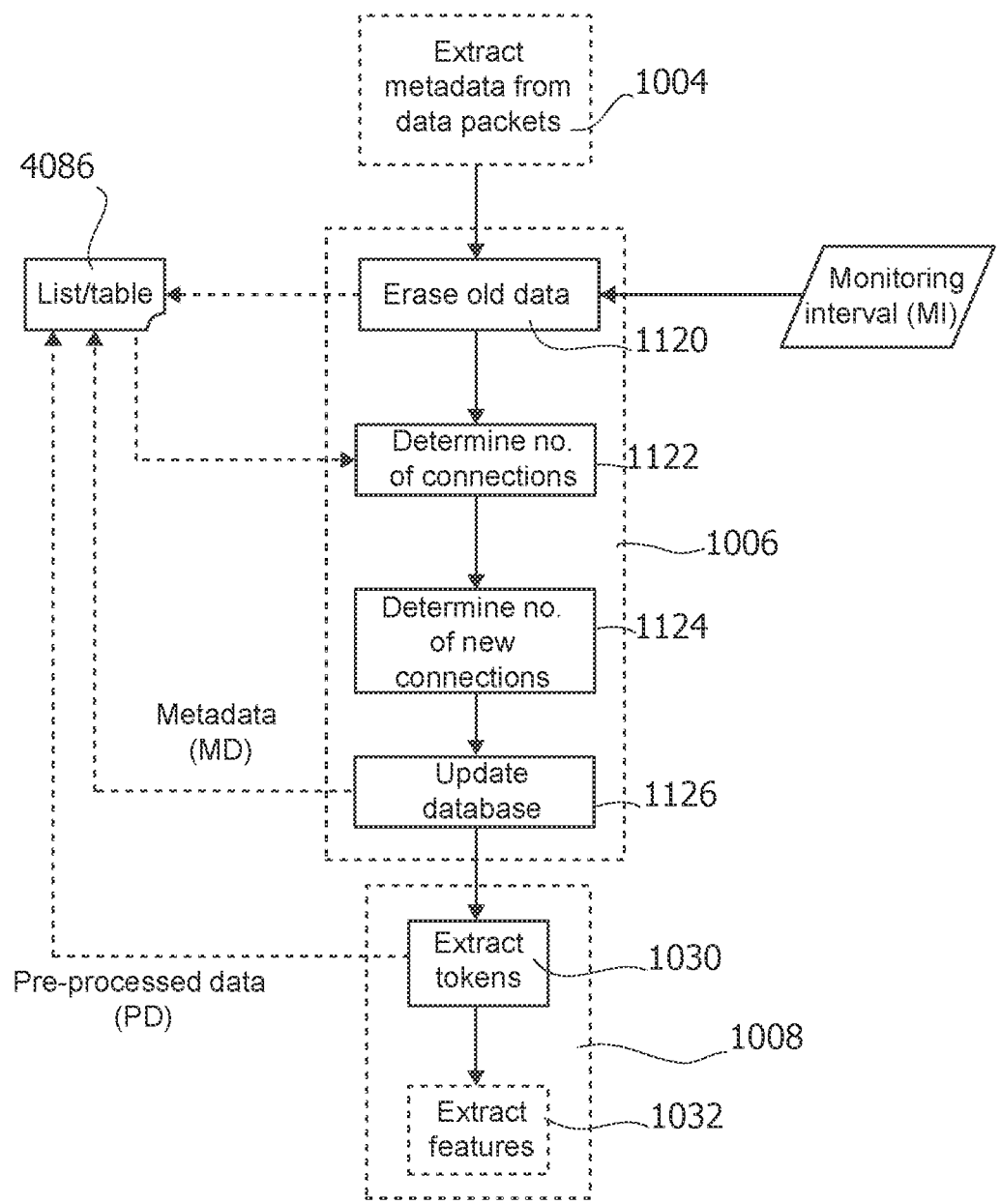
FIG. 6 shows an embodiment for management of a database that comprises the data that can be used for the learning step.

In particular, FIG. 6 shows a possible embodiment of steps 1006 and 1008. In particular, as explained previously, the computer 40a determines, in step 1006, only the connections that regard a given monitoring interval MI. Moreover, step 1008, and in particular step 1030, can be used to generate pre-processed data PD. For instance, in the embodiment considered, the data of the connections that are then used to generate the features are stored in a database (for example, the database 408), for instance in the form of a table or list 4086.

In particular, in the embodiment considered, the procedure of analysis (step 1000) is started, periodically or manually, after a given time interval with respect to a previous starting step. In particular, in various embodiments, this time interval corresponds to the testing interval VI. However, an operator could also specify a different testing interval VI, or the duration of the testing interval VI could be pre-set.

In the embodiment considered, the computer 40a then obtains, in a step 1120, the duration of the monitoring interval MI. For instance, the duration of the monitoring interval MI may be pre-set or may be calculated with respect to a given date and time selected. For instance, the date can be determined automatically (for example, by selecting the current date minus 30 days) and the time can be pre-set (for example, in the 0-to-24 hour range of the day selected).

Consequently, in various embodiments, the computer 40a can erase, in step 1120, from the database 4086 also the data of the connections that are older than the monitoring interval MI.

In various embodiments, the computer 40a then determines, in a step 1122, for a given machine SRC the number of connections $n_{of}$ saved in the table/list 4086. For instance, for this purpose, the data of each machine SRC can be saved in a respective table/list. Moreover, the computer 40a determines, in a step 1124, the number $n_{nf}$ of the new connections for the machine SRC extracted from the database 408, i.e., the tables/lists 4080, 4082, 4084.

Consequently, in various embodiments, the computer 40a can use as training dataset, for example, $F_{SRC,TI}$, the respective data of the $n_{of}$ connections of a given machine (or the respective features of the machines of the set GRP) and as testing dataset, for example, $F_{SRC,VI}$, the respective data of the $n_{nf}$ connections of the machine SRC.

In various embodiments, the computer 40a updates, in a step 1126, also the data stored in the database 4086 on the basis of the data of the new connections. In particular, for this purpose, the computer uses a (constant or programmable) parameter that indicates the maximum number $n_f$ of connections to be saved for each machine SRC. Consequently, the computer 40a can compute a number of data $n_s$ to be entered in the database 4086. For instance, for this purpose, the computer 40a can compute the number of features that are lacking to reach the "maximum" number $n_f$, provided that there are at least already present a certain number of features (fixed, for example, at 0.5% of $n_f$) and that this number is at least equal to 1. In addition, if $n_{nf}$ were not to reach $n_s$, the computer 40a adds only the new data of the connections available, namely $$n_s = \max(n_f - n_{of}, 0.005 \cdot n_f, 1)$$

$$n_s = \min(n_s, n_{of})$$

The computer 40a can then possibly erase, in step 1126, from the database 4086 some connections to free the space to add the $n_s$ new records, in particular in the case where $n_{of} + n_s > n_f$. Preferably, the computer randomly selects the connections to be erased and/or to be entered.

Consequently, the computer 40a can save, in step 1126, at least a part of the metadata MD of the $n_s$ connections in the database 4086. For instance, in various embodiments, the computer saves only the metadata MD that are then used during the subsequent step of feature extraction in steps 1032-1036. In fact, as shown in FIG. 6, preferably the computer 40a stores also at least one part of the pre-processed data PD for each of the $n_s$ new connections in the database 4086. For instance, in this way, the computer 40a can store in the database 4086 already the tokens described previously, whilst the enumeration of the categorical parameters and/or the statistical analyzes can be carried out in real time. Consequently, instead of extracting all the data of the connections from the database 408 when the procedure is started up, the computer can cyclically update the data of the connections stored in the database 4086.

Furthermore, as explained previously, step 1010 identifies anomalous/suspect connections. Once the results on the inconsistency of the individual data and/or connections are obtained, the computer 40a can also aggregate, in step 1112, the results in order to obtain a value of inconsistency that is no longer by packet/connection but by single machine and/or for the entire network under analysis.

For instance, in a currently preferred embodiment, the computer 40a is configured for obtaining, for a given interval VI, the mean value of inconsistencies described previously for all the connections classified as anomalous. Next, the computer 40a selects the respective mean values of inconsistencies of each machine SRC and calculates a respective overall mean value on the basis of the data of the machine. Consequently, in this way, the computer obtains for each verification interval VI a respective overall mean value for each machine. In general, the computer 40a could also divide the data of the testing interval VI into sub-intervals (for example, of one hour) and compute, for each verification sub-interval, a respective overall mean value for each machine.

In various embodiments, the computer 40a also determines the respective number of inconsistencies of each machine SRC for the interval VI (or for each sub-interval).

Consequently, in this way, the computer can determine a list/table that comprises:

the identifier of the machine SRC;
an identifier of the interval TI or of the respective sub-interval;
the overall mean value calculated for the anomalous connections of the machine SRC in the interval TI or the respective sub-interval; and
optionally the number of anomalous connections of the machine SRC in the interval TI or respective sub-interval.

In various embodiments, the computer 40a then generates a first list of overall mean values and/or numbers of the anomalous connections, selecting the data of the various intervals/sub-intervals of a given machine SRC. Additionally, the computer 40a generates a second list of overall mean values and/or numbers of anomalous connections, selecting the data, associated to a given interval VI (or sub-interval), of the different machines SRC.

The first and/or second list can then be analyzed statistically, for example to understand the statistical distribution of the data.

For instance, in various embodiments, the computer 40a determines a first histogram for the overall mean values of the first list. Additionally, the computer 40a determines a second histogram for the numbers of the connections of the first list.

Likewise, the computer 40a can determine a third histogram for the overall mean values of the second list, and/or a fourth histogram for the numbers of the connections of the second list.

For instance, to generate a histogram, the computer can first discretize the respective overall mean values, and possibly also the numbers of the connections.

Consequently, associated to each value is the number of occurrences o of the respective discretized value in the respective list. Likewise, an analysis could be carried out for so-called quantiles. Hence, this analysis provides a list of discretized values and the respective values of occurrence o.

In various embodiments, the values of occurrence o are then weighted via a non-linear function, which weights more the values of occurrence o that are higher.

For instance, in various embodiments, the computer obtains weighted values o' using the following equation:

$$o' = o^c$$

where c is a coefficient and for example corresponds to e.

Consequently, in various embodiments, the computer can obtain, for each of the histograms, a single representative value, for example by calculating the mean value of the weighted values of occurrence o', i.e., $\overline{o}'$. For instance, such final values (for example, $\overline{o}'$) can be used to compare the behavior of the network over time.

Of course, without prejudice to the underlying principles of the invention, the details of implementation and the embodiments may vary widely with respect to what has been described and illustrated herein purely by way of example, without thereby departing from the scope of the present invention, as defined in the annexed claims.

The invention claimed is:

1. A method of detecting anomalies in communications exchanged via a communication network between a respective source and a respective destination, comprising steps of:

obtaining metadata for a plurality of communications in a monitoring interval, wherein said metadata includes for each communication an identifier of said source, an identifier of said destination, and data extracted from an application protocol of the respective communication, wherein said communications comprises Hypertext Transfer Protocol (HTTP) communications;

processing said extracted data to obtain preprocessed data comprising one or more tokens for the respective communication, wherein each token comprises a string, wherein said one or more tokens are extracted from user agent field or referrer field;

dividing said monitoring interval into a training interval and a verification interval;

obtaining the identifier of a given source and generating a first list of a plurality of features ($F_{SRC,TI}$) for connections of said given source in said training interval via following steps:

selecting the connections of said given source in said training interval, determining for said connections of said given source in the said training interval the univocal destination identifiers and for each token the respective univocal values, determining a first set of enumeration rules by enumerating said univocal destination identifiers and for each token the respective univocal values, and associating by means of said first set of enumeration rules with each connection of said source in said training interval a respective enumerated destination identifier and one or more respective enumerated tokens, wherein said first list of features comprises for each connection of said given source in said training interval the respective enumerated destination identifier and the respective one or more enumerated tokens;

obtaining the identifier of a group of devices to which said given source belongs and generating a second list of a plurality of features for the connections of the devices belonging to said group of devices in said training interval via following steps:

selecting the connections of said group of devices in said training interval, determining for said connections of said group of devices in said training range the univocal destination identifiers and for each token the respective univocal values, determining a second set of enumeration rules by enumerating said univocal destination identifiers and for each token the respective univocal values, and associating by means of said second set of enumeration rules with each connection of said group of devices in said training interval a respective enumerated destination identifier and one or more respective enumerated tokens, wherein said second list of features comprises for each connection of said group of devices in said training interval the respective enumerated destination identifier and the respective one or more enumerated tokens;

generating a first set of Bayesian networks by training for each feature of said first list of features a respective Bayesian network using the data of other features of said first list of features ($F_{SRC,TI}$), and generating a second set of Bayesian networks by training for each feature of said second list of features a respective Bayesian network using the data of the other features of said second list of features, generating a third list of a plurality of features for the connections of said given source in said verification interval via following steps:

selecting the connections of said given source in said verification interval, and associating by means of said first set of enumeration rules with each connection of said given source in said verification interval a respective enumerated destination identifier and one or more respective enumerated tokens, wherein said third list of features comprises for each connection of said given source in said verification interval the respective enumerated destination identifier and the respective one or more respective enumerated tokens;

generating a fourth list of a plurality of features for connections of said given source in said verification interval via following steps:

selecting the connections of said given source in said verification interval, associating by means of said second set of enumeration rules with each connection of said given source in said verification interval a respective enumerated destination identifier and one or more respective enumerated tokens, wherein said fourth list of features comprises for each connection of said given source in said verification interval the respective enumerated destination identifier and the respective one or more respective enumerated tokens, wherein said first list of a plurality of features, said second list of a plurality of features, said third list of a plurality of features and said fourth list of a plurality of features further comprise at least one of: an enumerated value generated for a destination port of Transmission Control Protocol (TCP) or the User Datagram Protocol (UDP) of the respective communication;

repeating following steps for each connection of said given source in said verification interval:

determining based on the values of the features of said third list of features associated with the respective connection of said given source for each feature of said third list of features the respective most probable value by using said first set of Bayesian networks, classifying each value of the features of said third list of features associated with the respective connection of said given source via following steps:

in response to determining the value of a feature of said third list of features corresponds to the respective most probable value, classifying the value of the feature of said third list of features as normal, and in response to determining the value of a feature of said third list of features does not correspond to the respective most probable value:

a) determining for the value of said feature of said third list of features the respective probability of occurrence by using said first set of Bayesian networks, and b) classifying the value of said feature of said third list of features as normal in response to determining the respective probability of occurrence is greater than a first threshold, and c) classifying the value of said feature of said third list of features as anomalous in response to determining the respective probability of occurrence is smaller than said first threshold; and determining based on the values of the feature values of said fourth list of features associated with the respective connection of said given source for each feature of said fourth list of features the respective most probable value by using said second set of Bayesian networks, wherein discretizing one or more of the features of said first list of a plurality of features, said second list of features of a plurality of features, said third list of a plurality of features, and said fourth list of a plurality of features by means of a clustering algorithm, a k-means clustering algorithm, and classifying each value of the features of said fourth list of features associated with the respective connection of said given source via following steps:

in response to determining the value of a feature of said fourth list of features corresponds to the respective most probable value, classifying the value of the feature of said fourth list of features as normal, and in response to determining the value of a feature of said fourth list of features does not correspond to the respective most probable value:

a) determining for the value of said feature of said fourth list of features the respective probability of occurrence by using said second set of Bayesian networks, and b) classifying the value of said feature of said fourth list of features as normal in response to determining the respective probability of occurrence is greater than a second threshold, and c) classifying the value of said feature of said fourth list of features as anomalous in response to determining the respective probability of occurrence is smaller than said second threshold.

2. The method according to claim 1, comprising:
repeating following steps for each connection of said given source in said verification interval:
determining a first number of values of the features of said third list of features associated with the respective connection of said given source that are classified as anomalous,
determining a second number of values of the features of said fourth list of features associated with the respective connection of said given source that are classified as anomalous, and
classifying the connection of said given source as anomalous if the first number or the second number is greater than a third threshold.

3. The method according to claim 2, comprising:
training a first single-class Support Vector Machine, SVM, by using said first list of features,
repeating following steps for each connection of said given source in said verification interval:
classifying the values of the features of said third list of features associated with the respective connection of said given source as normal or anomalous by using said first SVM, and
classifying the connection of said given source as suspicious if the connection of said given source is classified as anomalous and the values of the features of said third list of features associated with the respective connection of said given source are classified as anomalous by said first SVM.

4. The method according to claim 2, comprising:
training a second single-class SVM by using said second list of features,
repeating following steps for each connection of said given source in said verification interval:

classifying the values of the feature of said fourth list of features associated with the respective connection of said given source as normal or anomalous by using said second SVM, and
classifying the connection of said given source as suspicious if the connection of said given source is classified as anomalous and the feature values of said fourth list of features associated with the respective connection of said given source are classified as anomalous by said second SVM.

5. The method according to claim 1, comprising:
repeating following steps for each connection of said given source in said verification interval:
determining a first average value of the probabilities of occurrence of the values of the features in said third feature list associated with the respective connection of said given source that are classified as anomalous,
determining a second average value of the probability of occurrence of the values of the features of said fourth feature list associated with the respective connection of said given source that are classified as anomalous, and
classifying the connection of said given source as anomalous if the first average value and/or the second average value is smaller than a fourth threshold.

6. The method according to claim 1, comprising:
repeating following steps for each source of a plurality of sources:
obtaining a respective identifier of the respective source and generating a respective first list of a plurality of features for the connections of the respective source in said training interval,
calculating for each feature of the respective first list of a plurality of features a respective average value, thereby generating a fifth list of features comprising for each source the respective average values of the features of the respective first list of a plurality of features, and
generating groups of devices by applying a clustering algorithm, a k-means clustering algorithm, to said fifth list of features.

7. The method according to claim 1, wherein said communications further comprise HTTP communications, and wherein said one or more tokens are selected from: the HTTP method, the host, the mime type; or
wherein said communications comprise Server Message Block (SMB) communications, and wherein said one or more tokens are chosen from: the relative or absolute path to the file or one or more tokens extracted from the path to the file.

8. The method according to claim 1, wherein said first list of a plurality of features, said second list of a plurality of features, said third list of a plurality of features and said fourth list of a plurality of features further comprise at least one of:
a numerical value identifying the duration of the connection, and
a numeric value identifying the amount of data exchanged.

9. The method according to claim 1, comprising:
managing a database comprising for each source of a plurality of sources a respective list, wherein each list comprises metadata or preprocessed data of a subset of the connections of the respective source in said training interval, wherein said managing a database comprises:
deleting data that are older than said training interval,
receiving for a given source a list of metadata or preprocessed data of the connections of the respective source in said verification interval, selecting the list associated with said source and determining a first number of connections saved in said selected list, determining the number of connections of the respective source in said verification interval, determining a second number of connections as a function of a maximum number of connections, said first number of connections saved in said selected list and said number of connections of the respective source in said verification interval, randomly selecting said second connection number from said connections of the respective source in said verification interval and inserting the metadata and/or preprocessed data of said selected connections into said selected list, and possibly randomly deleting connections from said selected list if the number of connections saved in said selected list exceeds said maximum number of connections.

10. A device comprising:
at least one hardware processor that is configured to perform operations comprising:
obtaining metadata for a plurality of communications in a monitoring interval, wherein said metadata includes for each communication an identifier of said source, an identifier of said destination, and data extracted from an application protocol of the respective communication, wherein said communications comprises Hypertext Transfer Protocol (HTTP) communications;

processing said extracted data to obtain preprocessed data comprising one or more tokens for the respective communication, wherein each token comprises a string, wherein said one or more tokens are extracted from user agent field or referrer field;

dividing said monitoring interval into a training interval and a verification interval;

obtaining the identifier of a given source and generating a first list of a plurality of features ($F_{SRC,TI}$) for connections of said given source in said training interval via following steps:
selecting the connections of said given source in said training interval,
determining for said connections of said given source in the said training interval the univocal destination identifiers and for each token the respective univocal values,
determining a first set of enumeration rules by enumerating said univocal destination identifiers and for each token the respective univocal values, and
associating by means of said first set of enumeration rules with each connection of said source in said training interval a respective enumerated destination identifier and one or more respective enumerated tokens, wherein said first list of features comprises for each connection of said given source in said training interval the respective enumerated destination identifier and the respective one or more enumerated tokens;

obtaining the identifier of a group of devices to which said given source belongs and generating a second list of a plurality of features for the connections of the devices belonging to said group of devices in said training interval via following steps:
selecting the connections of said group of devices in said training interval,
determining for said connections of said group of devices in said training range the univocal destination identifiers and for each token the respective univocal values,
determining a second set of enumeration rules by enumerating said univocal destination identifiers and for each token the respective univocal values, and
associating by means of said second set of enumeration rules with each connection of said group of devices in said training interval a respective enumerated destination identifier and one or more respective enumerated tokens, wherein said second list of features comprises for each connection of said group of devices in said training interval the respective enumerated destination identifier and the respective one or more enumerated tokens;

generating a first set of Bayesian networks by training for each feature of said first list of features a respective Bayesian network using the data of other features of said first list of features ($F_{SRC,TI}$), and generating a second set of Bayesian networks by training for each feature of said second list of features a respective Bayesian network using the data of the other features of said second list of features, generating a third list of a plurality of features for the connections of said given source in said verification interval via following steps:
selecting the connections of said given source in said verification interval, and
associating by means of said first set of enumeration rules with each connection of said given source in said verification interval a respective enumerated destination identifier and one or more respective enumerated tokens, wherein said third list of features comprises for each connection of said given source in said verification interval the respective enumerated destination identifier and the respective one or more respective enumerated tokens;

generating a fourth list of a plurality of features for connections of said given source in said verification interval via following steps:
selecting the connections of said given source in said verification interval,
associating by means of said second set of enumeration rules with each connection of said given source in said verification interval a respective enumerated destination identifier and one or more respective enumerated tokens, wherein said fourth list of features comprises for each connection of said given source in said verification interval the respective enumerated destination identifier and the respective one or more respective enumerated tokens, wherein said first list of a plurality of features, said second list of a plurality of features, said third list of a plurality of features and said fourth list of a plurality of features further comprise at least one of: an enumerated value generated for a destination port of Transmission Control Protocol (TCP) or the User Datagram Protocol (UDP) of the respective communication;

repeating following steps for each connection of said given source in said verification interval:
determining based on the values of the features of said third list of features associated with the respective connection of said given source for each feature of said third list of features the respective most probable value by using said first set of Bayesian networks, classifying each value of the features of said third list of features associated with the respective connection of said given source via following steps:

in response to determining the value of a feature of said third list of features corresponds to the respective most probable value, classifying the value of the feature of said third list of features as normal, and in response to determining the value of a feature of said third list of features does not correspond to the respective most probable value:

a) determining for the value of said feature of said third list of features the respective probability of occurrence by using said first set of Bayesian networks, and b) classifying the value of said feature of said third list of features as normal in response to determining the respective probability of occurrence is greater than a first threshold, and c) classifying the value of said feature of said third list of features as anomalous in response to determining the respective probability of occurrence is smaller than said first threshold; and determining based on the values of the feature values of said fourth list of features associated with the respective connection of said given source for each feature of said fourth list of features the respective most probable value by using said second set of Bayesian networks, wherein discretizing one or more of the features of said first list of a plurality of features, said second list of features of a plurality of features, said third list of a plurality of features, and said fourth list of a plurality of features by means of a clustering algorithm, a k-means clustering algorithm, and classifying each value of the features of said fourth list of features associated with the respective connection of said given source via following steps:

in response to determining the value of a feature of said fourth list of features corresponds to the respective most probable value, classifying the value of the feature of said fourth list of features as normal, and in response to determining the value of a feature of said fourth list of features does not correspond to the respective most probable value:

a) determining for the value of said feature of said fourth list of features the respective probability of occurrence by using said second set of Bayesian networks, and b) classifying the value of said feature of said fourth list of features as normal in response to determining the respective probability of occurrence is greater than a second threshold, and c) classifying the value of said feature of said fourth list of features as anomalous in response to determining the respective probability of occurrence is smaller than said second threshold.

11. A computer-program product stored on a non-transitory computer readable memory that is coupled to at least one processor and comprises portions of software code that are configured to cause the at least one processor to perform operations comprising:

obtaining metadata for a plurality of communications in a monitoring interval, wherein said metadata includes for each communication an identifier of said source, an identifier of said destination, and data extracted from an application protocol of the respective communication, wherein said communications comprises Hypertext Transfer Protocol (HTTP) communications;

processing said extracted data to obtain preprocessed data comprising one or more tokens for the respective communication, wherein each token comprises a string, wherein said one or more tokens are extracted from user agent field or referrer field;

dividing said monitoring interval into a training interval and a verification interval;

obtaining the identifier of a given source and generating a first list of a plurality of features ($F_{SRC,TI}$) for connections of said given source in said training interval via following steps:

selecting the connections of said given source in said training interval, determining for said connections of said given source in the said training interval the univocal destination identifiers and for each token the respective univocal values, determining a first set of enumeration rules by enumerating said univocal destination identifiers and for each token the respective univocal values, and associating by means of said first set of enumeration rules with each connection of said source in said training interval a respective enumerated destination identifier and one or more respective enumerated tokens, wherein said first list of features comprises for each connection of said given source in said training interval the respective enumerated destination identifier and the respective one or more enumerated tokens;

obtaining the identifier of a group of devices to which said given source belongs and generating a second list of a plurality of features for the connections of the devices belonging to said group of devices in said training interval via following steps:

selecting the connections of said group of devices in said training interval, determining for said connections of said group of devices in said training range the univocal destination identifiers and for each token the respective univocal values, determining a second set of enumeration rules by enumerating said univocal destination identifiers and for each token the respective univocal values, and associating by means of said second set of enumeration rules with each connection of said group of devices in said training interval a respective enumerated destination identifier and one or more respective enumerated tokens, wherein said second list of features comprises for each connection of said group of devices in said training interval the respective enumerated destination identifier and the respective one or more enumerated tokens;

generating a first set of Bayesian networks by training for each feature of said first list of features a respective Bayesian network using the data of other features of said first list of features ($F_{SRC,TI}$), and generating a second set of Bayesian networks by training for each feature of said second list of features a respective Bayesian network using the data of the other features of said second list of features, generating a third list of a plurality of features for the connections of said given source in said verification interval via following steps:
- selecting the connections of said given source in said verification interval, and
- associating by means of said first set of enumeration rules with each connection of said given source in said verification interval a respective enumerated destination identifier and one or more respective enumerated tokens, wherein said third list of features comprises for each connection of said given source in said verification interval the respective enumerated destination identifier and the respective one or more respective enumerated tokens;

generating a fourth list of a plurality of features for connections of said given source in said verification interval via following steps:
- selecting the connections of said given source in said verification interval,
- associating by means of said second set of enumeration rules with each connection of said given source in said verification interval a respective enumerated destination identifier and one or more respective enumerated tokens, wherein said fourth list of features comprises for each connection of said given source in said verification interval the respective enumerated destination identifier and the respective one or more respective enumerated tokens, wherein said first list of a plurality of features, said second list of a plurality of features, said third list of a plurality of features and said fourth list of a plurality of features further comprise at least one of: an enumerated value generated for a destination port of Transmission Control Protocol (TCP) or the User Datagram Protocol (UDP) of the respective communication;

repeating following steps for each connection of said given source in said verification interval:
- determining based on the values of the features of said third list of features associated with the respective connection of said given source for each feature of said third list of features the respective most probable value by using said first set of Bayesian networks,
- classifying each value of the features of said third list of features associated with the respective connection of said given source via following steps:
  - in response to determining the value of a feature of said third list of features corresponds to the respective most probable value, classifying the value of the feature of said third list of features as normal, and
  - in response to determining the value of a feature of said third list of features does not correspond to the respective most probable value:
    a) determining for the value of said feature of said third list of features the respective probability of occurrence by using said first set of Bayesian networks, and
    b) classifying the value of said feature of said third list of features as normal in response to determining the respective probability of occurrence is greater than a first threshold, and
    c) classifying the value of said feature of said third list of features as anomalous in response to determining the respective probability of occurrence is smaller than said first threshold; and
- determining based on the values of the feature values of said fourth list of features associated with the respective connection of said given source for each feature of said fourth list of features the respective most probable value by using said second set of Bayesian networks, wherein discretizing one or more of the features of said first list of a plurality of features, said second list of features of a plurality of features, said third list of a plurality of features, and said fourth list of a plurality of features by means of a clustering algorithm, a k-means clustering algorithm, and
- classifying each value of the features of said fourth list of features associated with the respective connection of said given source via following steps:
  - in response to determining the value of a feature of said fourth list of features corresponds to the respective most probable value, classifying the value of the feature of said fourth list of features as normal, and
  - in response to determining the value of a feature of said fourth list of features does not correspond to the respective most probable value:
    a) determining for the value of said feature of said fourth list of features the respective probability of occurrence by using said second set of Bayesian networks, and
    b) classifying the value of said feature of said fourth list of features as normal in response to determining the respective probability of occurrence is greater than a second threshold, and
    c) classifying the value of said feature of said fourth list of features as anomalous in response to determining the respective probability of occurrence is smaller than said second threshold.

* * * * *